(12) United States Patent
Gupta et al.

(10) Patent No.: US 12,424,219 B2
(45) Date of Patent: Sep. 23, 2025

(54) SYSTEM AND METHOD FOR RECEIVING A VOICE COMMAND

(71) Applicant: SAMSUNG ELECTRONICS CO., LTD., Suwon-si (KR)

(72) Inventors: Lahar Gupta, New Delhi (IN); Sachin Chugh, Ghaziabad (IN); Mangi Lal Sharma, Tehsil Ratangarh (IN); Mohit Sharma, Neem-ka-Thana (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 234 days.

(21) Appl. No.: 18/212,535

(22) Filed: Jun. 21, 2023

(65) Prior Publication Data

US 2024/0079004 A1    Mar. 7, 2024

Related U.S. Application Data

(63) Continuation of application No. PCT/KR2023/008052, filed on Jun. 12, 2023.

(30) Foreign Application Priority Data

Sep. 5, 2022    (IN) .............. 202211050691

(51) Int. Cl.
*G10L 15/00* (2013.01)
*G10L 15/02* (2006.01)
(Continued)

(52) U.S. Cl.
CPC .............. *G10L 15/22* (2013.01); *G10L 15/02* (2013.01); *G10L 15/30* (2013.01); *H04L 67/12* (2013.01); *G10L 2015/025* (2013.01)

(58) Field of Classification Search
CPC ......... G10L 15/07; G10L 15/20; G10L 15/22; G10L 15/26; G10L 15/30; G10L 15/02;
(Continued)

(56) References Cited

U.S. PATENT DOCUMENTS 9,749,583 B1    8/2017    Fineberg et al.
10,524,046 B2    12/2019    Yang et al.
(Continued)

OTHER PUBLICATIONS

Justin Eltoft et al., "Coordinated Listening by Multiple Voice Assistants in the Smart Home to Localize Smoke Detector Low-Battery Warning Chirp", Dec. 2021, 7 pages.
(Continued)

*Primary Examiner* — Vu B Hang
(74) *Attorney, Agent, or Firm* — Sughrue Mion, PLLC

(57) ABSTRACT

A system and method of receiving a voice command while a user is moving in an Internet of Things (IoT) environment comprising a plurality of virtual assistants (VAs) is provided. The method includes receiving a first audio uttered by a user at a first VA. The user's intention to speak more (ISM) is determined based on the user's breathing pattern. Furthermore, the method includes selecting a second VA to initiate listening to a second audio uttered by the user, based on detecting a movement of the user with respect to the plurality of VAs in the IoT environment. The method includes merging the first audio and the second audio to determine a voice command corresponding to the user's complete utterance, for execution within the IoT environment.

20 Claims, 31 Drawing Sheets

(51) Int. Cl.
*G10L 15/22* (2006.01)
*G10L 15/30* (2013.01)
*H04L 67/12* (2022.01)

(58) Field of Classification Search
CPC ....... G10L 15/063; G10L 15/08; G10L 15/16; G10L 25/27; G10L 25/30; G10L 15/12; G10L 19/005; G10L 19/00; G10L 21/0208; G10L 25/78; G10L 25/87; G06F 3/16

See application file for complete search history.

(56) References Cited

U.S. PATENT DOCUMENTS

| | | |
|---|---|---|
| 10,706,850 B2 | 7/2020 | Tian et al. |
| 11,908,464 B2 | 2/2024 | Shin et al. |
| 2014/0365880 A1 | 12/2014 | Bellegarda |
| 2015/0228274 A1 | 8/2015 | Leppänen et al. |
| 2016/0210965 A1 | 7/2016 | Mun et al. |
| 2018/0088902 A1 | 3/2018 | Mese et al. |
| 2020/0072937 A1 | 3/2020 | Baek et al. |
| 2021/0090567 A1 | 3/2021 | Tukka et al. |
| 2021/0110814 A1 | 4/2021 | Iwase et al. |
| 2021/0174796 A1 | 6/2021 | Chae et al. |
| 2021/0183393 A1 | 6/2021 | Lee et al. |

OTHER PUBLICATIONS

Joe Svetlik et al., "Sonos claims Google is stopping multiple voice assistants working at the same time", https://www.whathifi.com/news/sonos-claims-google-is-stoppingmultiple-voice-assistants-working-at-the-same-time, Sep. 30, 2021, 7 pages.

Bob O'Donnell, "It's noisy in here! The coming problem of too many voice assistants", https://www.usatoday.com/story/tech/columnist/2017/04/07/s-noisyhere-coming-problem-too-many-voice-assistants/99696314/, Apr. 7, 2017, 3 pages.

Kathleen Walch, "The future of voice assistants is multiturn conversations", https://www.techtarget.com/searchenterpriseai/feature/Thefuture-of-voice-assistants-is-multiturn-conversations, Jul. 3, 2019, 4 pages.

Sarah Perez, "41% of voice assistant users have concerns about trust and privacy, report finds", https://techcrunch.com/2019/04/24/41-of-voice-assistant-users-haveconcerns-about-trust-and-privacy-report-finds/, Apr. 25, 2019, 8 pages.

International Search Report and Written Opinion (ISA/210 & 237) dated Sep. 20, 2023, issued by International Searching Authority in International Application No. PCT/KR2023/008052.

SYSTEM AND METHOD FOR RECEIVING A VOICE COMMAND

CROSS-REFERENCE TO RELATED APPLICATIONS

This application is a bypass continuation of PCT International Application No. PCT/KR2023/008052, which was filed on Jun. 12, 2023, and claims priority to Indian Patent Application No. 202211050691, filed on Sep. 5, 2022, in the Indian Patent Office, the disclosures of which are incorporated herein by reference in their entireties.

BACKGROUND

1. Field

The disclosure generally relates to voice assistant devices, and more particularly, to a system and method for receiving a voice command via multiple voice assistant devices.

2. Description of Related Art

With the recent advancements in the voice recognition field, voice assistants (VAs) have found applications in many areas like smart phone, smart television (TV), smart speaker, smart home, connected cars, robotics etc. They support voice commands, voice searching, and voice-activated device control. They are able to capture, detect end point, and execute the user commands. Improvements are continuously being done in this field for enhancing user experience.

Currently available voice assistants are trying to improve latency, accuracy and user experience. Further, with multiple devices in a smart home having voice assistance capability, the user interacts with VAs throughout the day. In the related art, when a user is moving while conversing with VAs, only an initial active VA can listen and process the utterance. Due to this limitation, parts of the utterance are missed and the user doesn't receive an appropriate response from the VAs. Instead, the user has to stand near the initial active VA to complete the utterance and move only when the utterance is complete. Even when multiple VAs are available in the smart home (or an Internet of Things (IoT)) environment, the related art does not leverage such devices to process the user utterances while the user is moving.

FIG. 1A illustrates a use case where a user provides a command for a voice assistant while 1 moving around in a smart home environment, according to the related art. The smart home environment 100 comprises multiple VAs such as 102, 104, 106, 108, 110, and 112. The user may be moving from a point A to point B within the environment 100 and may simultaneously provide a command for the VA 102 to "open the shades and let the morning light in". However, since the user may have moved away from the range of VA 102, the VA 102 may not be able to capture the complete utterance/command of the user. Thus, the VA 102 may not be able to provide an appropriate response to the user.

FIG. 1B illustrates a use case of overlapping utterances captured by multiple VAs in a smart home environment, where a user provides a command for a voice assistant while moving around, according to the related art. When multiple VAs are present in the smart home environment 100, each VA may capture a portion of a complete utterance/command of the user while the user is on the move. However, a major issue relates to combining the user utterance captured by the multiple VAs to recognize the command. Referring to FIG. 1B, a smart home environment may include multiple VAs, such as VA1, VA2, and VA3. The user may initiate an utterance including "Hi VA, Send mom a message. I will be there in 10 minutes". As shown Since the user is on the move the VA1 may be able to capture "Hi VA, Send mom a", while VA2 may be able to capture "mom a message. I will be there in", and VA3 may be able to capture "ere in 10 minutes." Thus, each VA may listen to a part of user utterance, but the utterance captured by each VA may be overlapping with each other.

Accordingly, in the related art, when the user gives a voice command on the move in a multi-VA environment, the voice command is captured partially, intermittently, or in an overlapping manner by multiple Vas. Since the command is not fully understood by a single VA, the command is not executed. This creates various problems. For instance, each VA has limited a listening range and the varying distance of the user from a listening VA during the move may affect what the listening VA is able to capture. Further, each VA along the user's path of movement only captures sections of a voice command, and the sections have a common overlapping part that is captured by sequential Vas along the path. Therefore, a VA cannot understand a command until it is fully received by it and even if received, a complete command cannot be formed due to overlapping ends.

Additionally, in the related art, a user needs to repeat a voice command again to a near available VA. All VAs have to be in always listening node which increases privacy and power consumption issues. Further, follow up or long voice commands are unable to be handled in such environment, placing limits on a smart home environment.

Thus, there is a need for a system and method which may allow a user to move around within an environment while providing a command to a VA. Further, there is a need for a system and method to leverage multiple VAs within an environment to listen to the user's voice command when the user is moving within the environment and to seamlessly process/execute the voice command by merging the user's utterances captured by multiple VAs.

SUMMARY

According to an aspect of the disclosure, a method of receiving a voice command, includes: receiving a first audio from a first virtual assistant (VA) from a plurality of virtual assistants (VAs) in an Internet of Things (IoT) environment, the first audio corresponding to a portion of a user's utterance; determining a breathing pattern of the user based on the first audio input, and determining an intention to speak more (ISM) of the user based on the breathing pattern; detecting, based on the first audio input, a movement of the user with respect to the plurality of VAs in the IoT environment; selecting a second VA from the plurality of VAs in the IoT environment to listen to a second audio, based on at least one of the ISM of the user, a signal strength of the first audio, a voiceprint of the user, and the movement of the user; receiving the second audio from the second VA, the second audio corresponding to a continuation of the user's utterance; and merging the first audio and the second audio to determine a voice command corresponding to the user's utterance, for execution within the IoT environment.

According to an aspect of the disclosure, a system for receiving a voice command, includes: a memory storing at least one instruction; and at least one processor configured to execute the at least one instruction to: receive a first audio from a first virtual assistant (VA) from a plurality of virtual assistants (VAs) in an Internet of Things (IoT) environment, the first audio corresponding to a portion of a user's utterance; determine a breathing pattern of the user based on the first audio input, and determining an intention to speak more (ISM) of the user based on the breathing pattern; detect, based on the first audio input, a movement of the user with respect to the plurality of VAs in the IoT environment; select a second VA from the plurality of VAs in the IoT environment to listen to a second audio, based on at least one of the ISM of the user, a signal strength of the first audio, a voiceprint of the user, and the movement of the user; receive the second audio from the second VA, the second audio corresponding to a continuation of the user's utterance; and merge the first audio and the second audio to determine a voice command corresponding to the user's utterance, for execution within the IoT environment.

According to an aspect of the disclosure, a computer readable medium stores computer readable program code or instructions which are executable by a processor to perform a method of receiving a voice command. The method includes: receiving a first audio from a first virtual assistant (VA) from a plurality of virtual assistants (VAs) in an Internet of Things (IoT) environment, the first audio corresponding to a portion of a user's utterance; determining a breathing pattern of the user based on the first audio input, and determining an intention to speak more (ISM) of the user based on the breathing pattern; detecting, based on the first audio input, a movement of the user with respect to the plurality of VAs in the IoT environment; selecting a second VA from the plurality of VAs in the IoT environment to listen to a second audio, based on at least one of the ISM of the user, a signal strength of the first audio, a voiceprint of the user, and the movement of the user; receiving the second audio from the second VA, the second audio corresponding to a continuation of the user's utterance; and merging the first audio and the second audio to determine a voice command corresponding to the user's utterance, for execution within the IoT environment.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
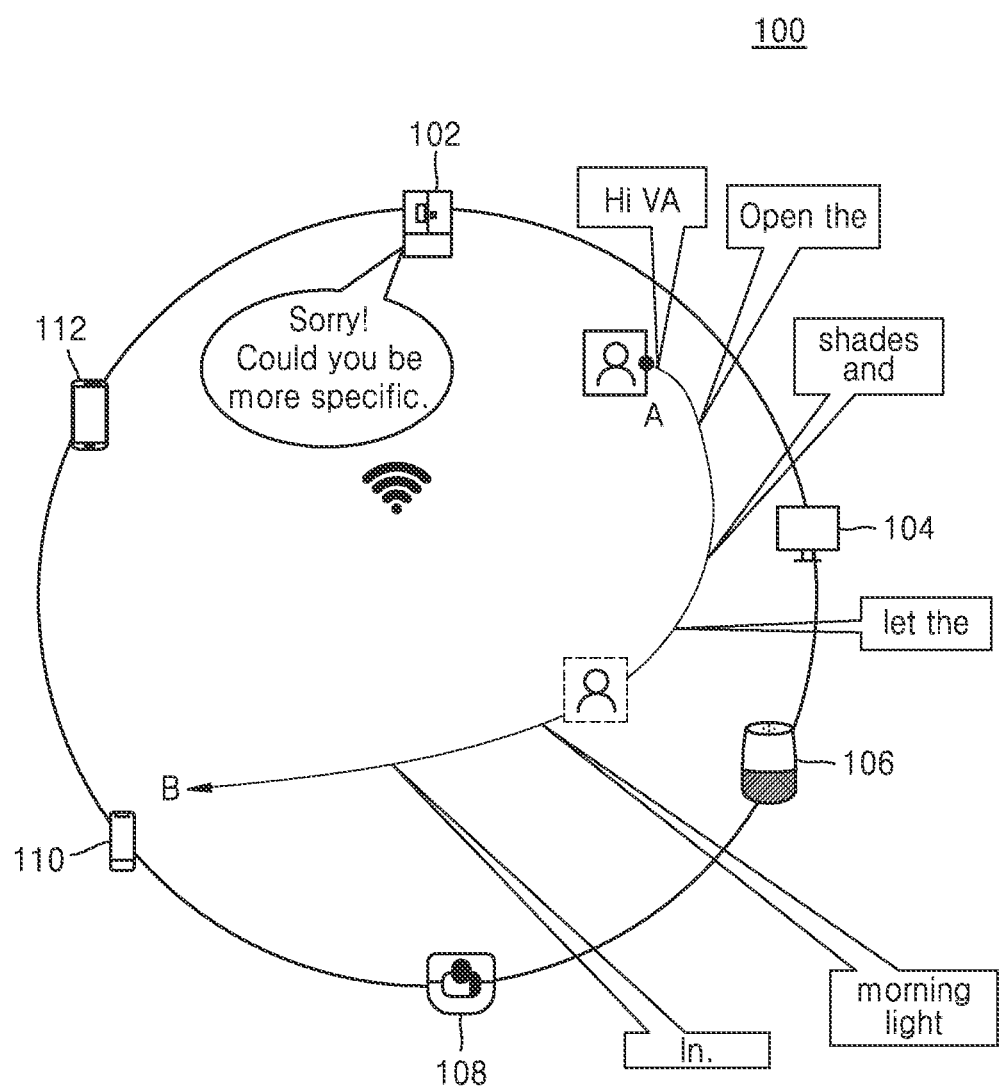
FIG. 1A illustrates a use case where a user provides a command for a voice assistant while moving around in a smart home environment, according to the related art.
Figure 1B:
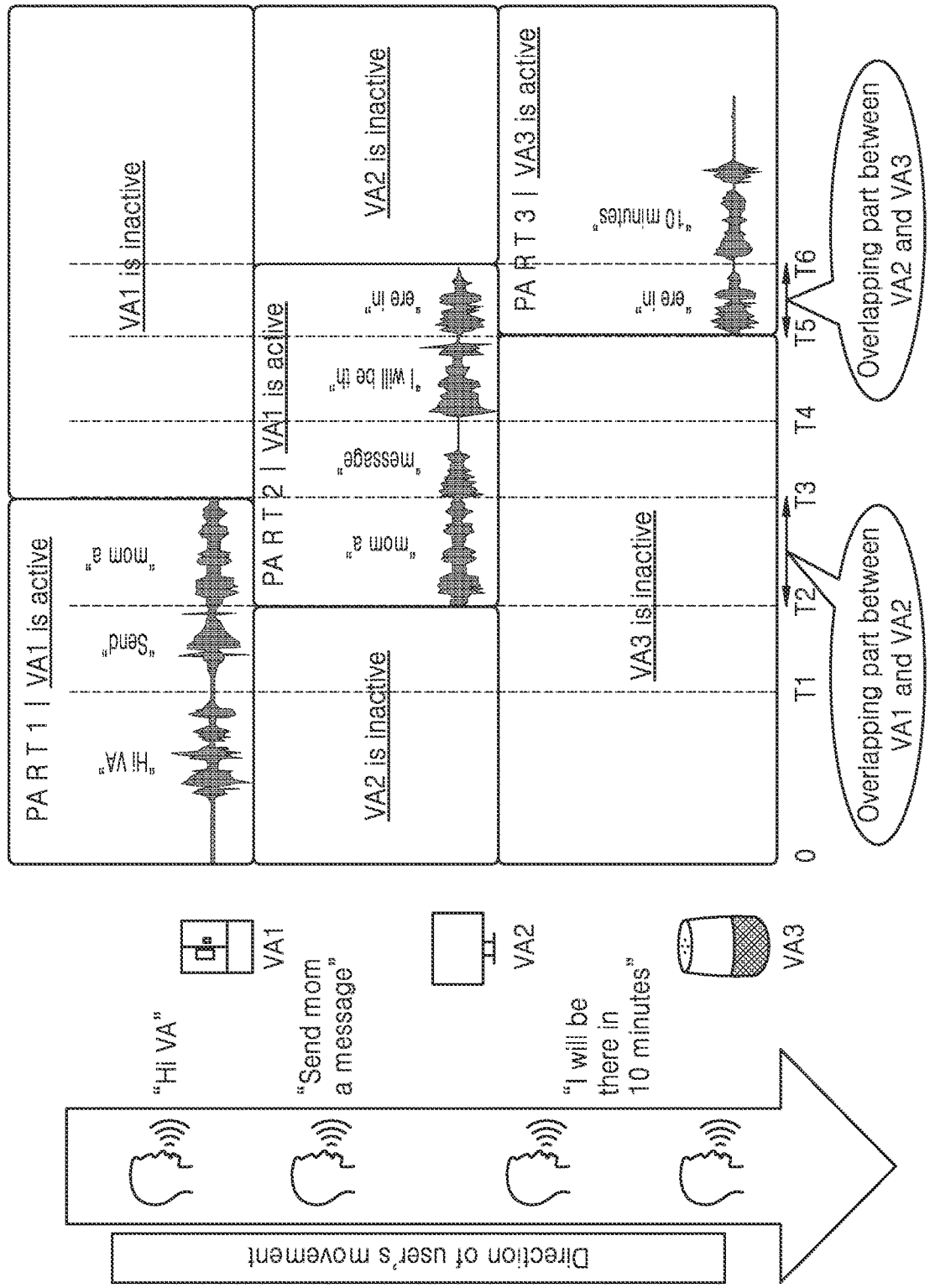
FIG. 1B illustrates a use case of overlapping utterances captured by multiple VAs in a smart home environment, where a user provides a command for a voice assistant while moving around, according to the related art.

For the purpose of promoting an understanding of the principles of the disclosure, reference will now be made to the various embodiments and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Skilled artisans will appreciate that elements in the drawings are illustrated for simplicity and may not have necessarily been drawn to scale. For example, the flow charts illustrate the method in terms of the most prominent operations involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having the benefit of the description herein.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The present disclosure is directed towards a method and system for receiving a voice command via controlled multiple voice assistant devices. Herein, voice assistant device may be an electronic device that performs voice recognition. Hereinafter, a VA (Virtual Assistant) may be a voice assistant device. Specifically, in an embodiment of the present disclosure, in a multi-VA system, when a user provides voice commands on the move and listened by a first VA, words/utterances (from command) are analyzed to understand continuation of a conversation on the movement, for selecting a second VA from multiple VAs present in an IoT (The Internet of Things) environment. IoT may be the network of physical objects—devices, instruments, vehicles, buildings and other items embedded with electronics, circuits, software, sensors and network connectivity that enables these objects to collect and exchange data. The selected second VA is wakeup in listening mode to listen follow up utterances and the first VA is shifted to sleep mode. Further, a third VA may be selected to wake up remaining follow up utterance, and the second VA may be shifted to sleep mode for continuing the conversation. The method based on the listening timing of each VA combines the utterances listened by first, second and third voice assistants to complete the full command for understanding and executing by the disclosed multi-VA system.

Further, in an embodiment of the present disclosure, when a user is on the move while conversing with multiple VAs, the multi-VA system may be configured to determine user's Intention to Speak More (ISM) using user's breathing pattern, dynamically calculating movement, which results in determining direction of movement of user, to enable active listening and sleeping of selected VAs to capture parts of single or follow-up voice commands on the move.

In an embodiment of the present disclosure, the speech components and non-speech components from the user environment may be identified, wherein the speech components (phonemes, graphemes etc.) and non-speech artifacts (i.e., breathing sounds, non-lexical speaker noise, etc.) are extracted and used to determine breathing patterns and continuation of utterances for the conversation (follow-up utterances). The ISM value may be calculated in the active voice assistant and that value may be passed on to next voice assistant(s) (in the direction of movement) after signal strength received by the active VA starts dropping below a particular threshold, so that a winner voice assistant (Multi Device Wake-up) wakes-up for listening the remaining command.

Further, in an embodiment of the present disclosure, the command completion using on-device support (with regeneration) is provided. While conversing, if on-device mode is enabled on the VA, then the captured audio may be passed on to next active VA. During the movement of user, when all captured utterances are combined based on listening time (ISM value etc.), the overlapping/missing ends are trimmed or selected or regenerated based on listening time (ISM Value) known by all VAs. Additionally, while conversing, selectively choosing a VA or its state (wakeup/sleep) for capturing part of the utterance, calculating based on time and speed of speech, the number of words spoken by user and whether useful meaning can be determined with it, the multi-VA system may be configured to re-generate missed starts/ends of words using regeneration methodologies such as GANs, for understanding and execution collectively.

Figure 2A:
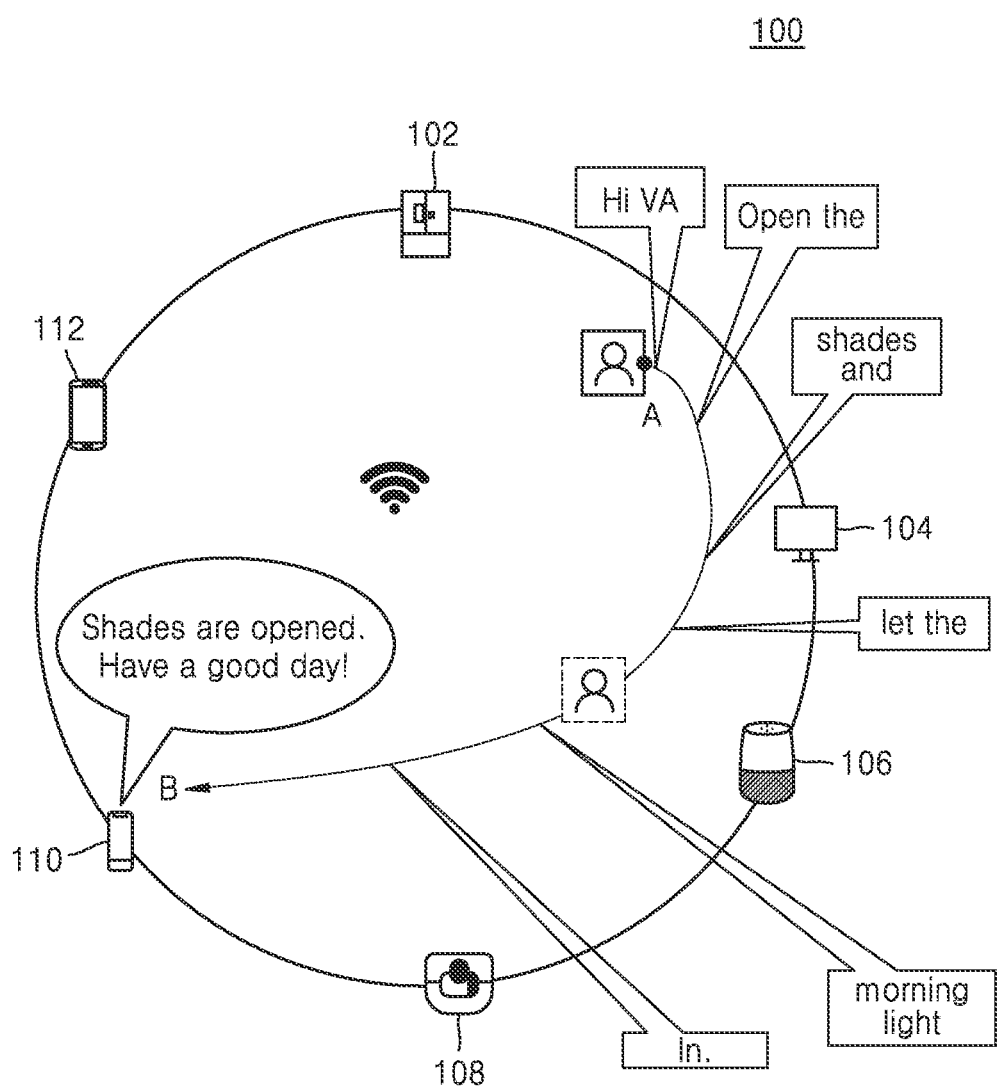
FIG. 2A illustrates a use case where a user provides a command for a voice assistant while moving around in a smart home environment, according to an embodiment of the present disclosure.

FIG. 2A illustrates a use case where a user provides a command for a voice assistant while moving around in a smart home environment, according to an embodiment of the present disclosure. As shown in FIG. 2A, the smart home environment 100 comprises multiple VAs such as 102, 104, 106, 108, 110, and 112. The user may be moving from a point A to point B within the environment 100 and may simultaneously provide a command by uttering "open the shades and let the morning light in". Based on the user's proximity to the VA 102, the VA 102 may initially being listening to the user's utterance. As the user moves away from the range of VA 102, the VA 102 may be unable to completely capture the user's utterance to recognize the command. In an embodiment, multiple VAs within the environment 100, such as VAs 104, 106, 108, 110, and 112 (in addition to VA 102) may be utilized/controlled to capture the complete user utterance along the user's movement path in the environment 100. As shown in FIG. 2A, the VA 110 may capture the last part of the user's utterance. In an embodiment, the VA that captures the last part of the user's utterance of the command (e.g., VA 110) may perform/execute the command. In an embodiment, after the last part of the user's utterance of the command is captured by a VA in the environment 100 (e.g., VA 110), the initial VA that captured a first part of the user's utterance (e.g., VA 102) may perform/execute the command with assistance of various VAs in the environment 100 that each captured a portion of the user's utterance (e.g., 104, 106, 108, 110), and the initial VA may provide an appropriate response to the user based on the received command.

Figure 2B:
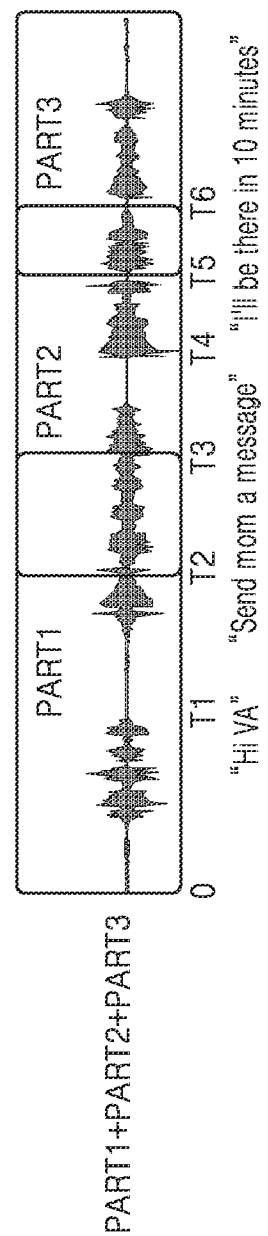
FIG. 2B illustrates a use case of multiple VAs in a smart home environment that capture an overlapping portion of a user's utterance of a command, where the user utters the command while moving around, according to an embodiment of the present disclosure.

FIG. 2B illustrates a use case of multiple VAs in a smart home environment that capture an overlapping portion of a user's utterance of a command, where the user utters the command while moving around, according to an embodiment of the present disclosure. When multiple VAs are present in the smart home environment 100, the multiple VAs may listen to the user's utterance while the user is on the move, and two or more VAs may each capture a same portion of the user's utterance. By combining the portions of the utterance captured by the multiple VAs based on timestamp information, a duplication of the overlapping utterances may be removed in the combined utterance. For example, as shown in FIG. 2B, the portions of the user's utterance from time T2 to time T3, and from time T5 to time T6 may be captured by multiple VAs causing overlapping to occur. By including the overlapping portion of the user's utterance from only one of the VAs in the combined user utterance/command, based on timestamp information, duplication may be removed in the combined utterance/command.

Figure 3A:
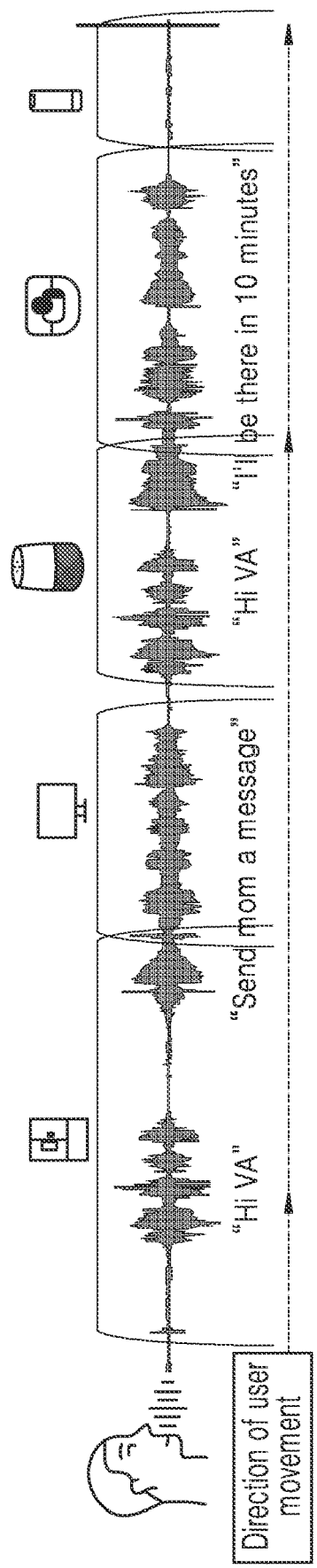
FIG. 3A illustrates an example use case in a smart home environment with multiple VAs, where a user provides a command while moving around, that requires a wake-up word, according to the related art.
Figure 3B:
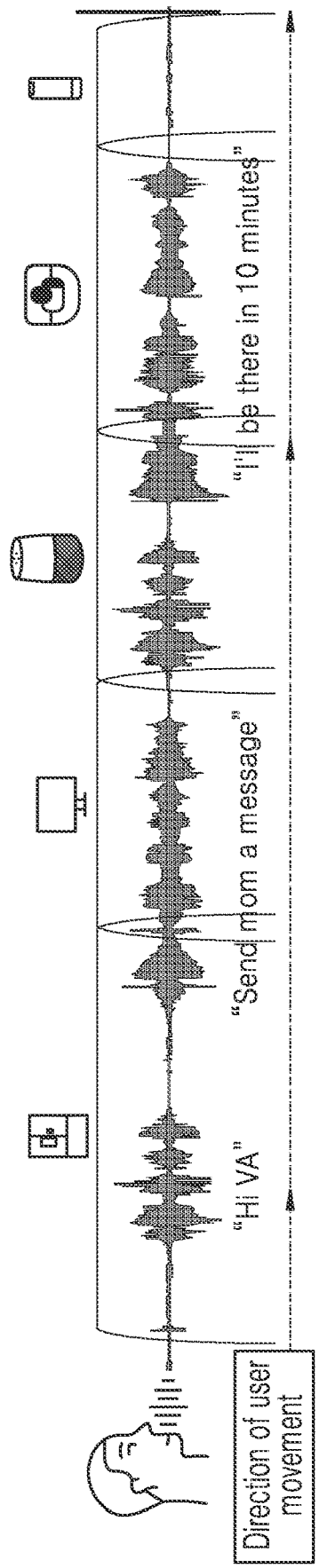
FIG. 3B illustrates an example use case in a smart home environment with multiple VAs, where a user provides a command while moving around, that eliminates a requirement of a wake-up word, according to an embodiment of the present disclosure.

FIG. 3A illustrates an example use case in a smart home environment with multiple VAs, where a user provides a command while moving around, that requires a wake-up word, according to the related art. FIG. 3B illustrates an example use case in a smart home environment with multiple VAs, where a user provides a command while moving around, that eliminates a requirement of a wake-up word, according to an embodiment of the present disclosure.

In the related art, the user may initially provide a voice command to a voice assistant such as "Send mom a message". To provide such a command, the user may initiate the command with a voice input comprising a hot word such as "Hi<<VA Name>>". In response to receipt of such hot word-based voice input, the VA is triggered and processes a voice command which is received within a specific time duration after the hot word. Various VAs may be triggered based on different pre-configured hot words or wake-up commands, such as "Hi<<VA name>>", "Hello <<VA name>>", "OK<<VA name>>", etc. The trigger/wake-up commands including the hot words may also be manually modified by the users. The specific duration after the hot word during which the to-be-executed voice command needs to be provided by the user, is pre-configured by the manufacturer during manufacturing of the VA device or system. In the related art solutions, when user is taking long pause (may be due to thinking about message content), the VA waits for a pre-configured or predefined listening time (e.g., 600 Milliseconds) for receiving speech. If the user does not provide any command within such a pre-configured time, the VA marks end of utterance, and stops listening which results in missing the continuation of utterance.

As shown in FIG. 3A, if there are long pauses by the user (e.g., at 301), a wake-up word (e.g., "Hi VA") needs to be repeated to wake-up the next available VA, for continuation of the user's utterance or a follow up voice command.

Referring to FIG. 3B, a user's breathing pattern may be continuously monitored to determine an intention of the user to continue utterance of a command, and a listening time of the VAs may be adjusted accordingly. Thus, the user does not need to repeat a wake-up word (e.g., "Hi VA") in a case of a long pause during the user's utterance or follow up voice command.

Specifically, an embodiment of the present disclosure analyzes breathing pattern of the user and further identify user's intention to speak more (ISM). Accordingly, the pre-configured or predefined listening time of the user may be modified dynamically to continue listening for continuation of utterance by the user via another VA. Further, in accordance with various embodiments of the present disclosure, once the user provides a command such as "how is weather today", the system of the present disclosure continuously analyzes breathing pattern of the user during VA's response and identify user's intention to speak more (ISM). Accordingly, the second VA will be auto-awaken to listen for follow-up utterance without any need for receiving wake-up command comprising hot word.

Figure 4A:
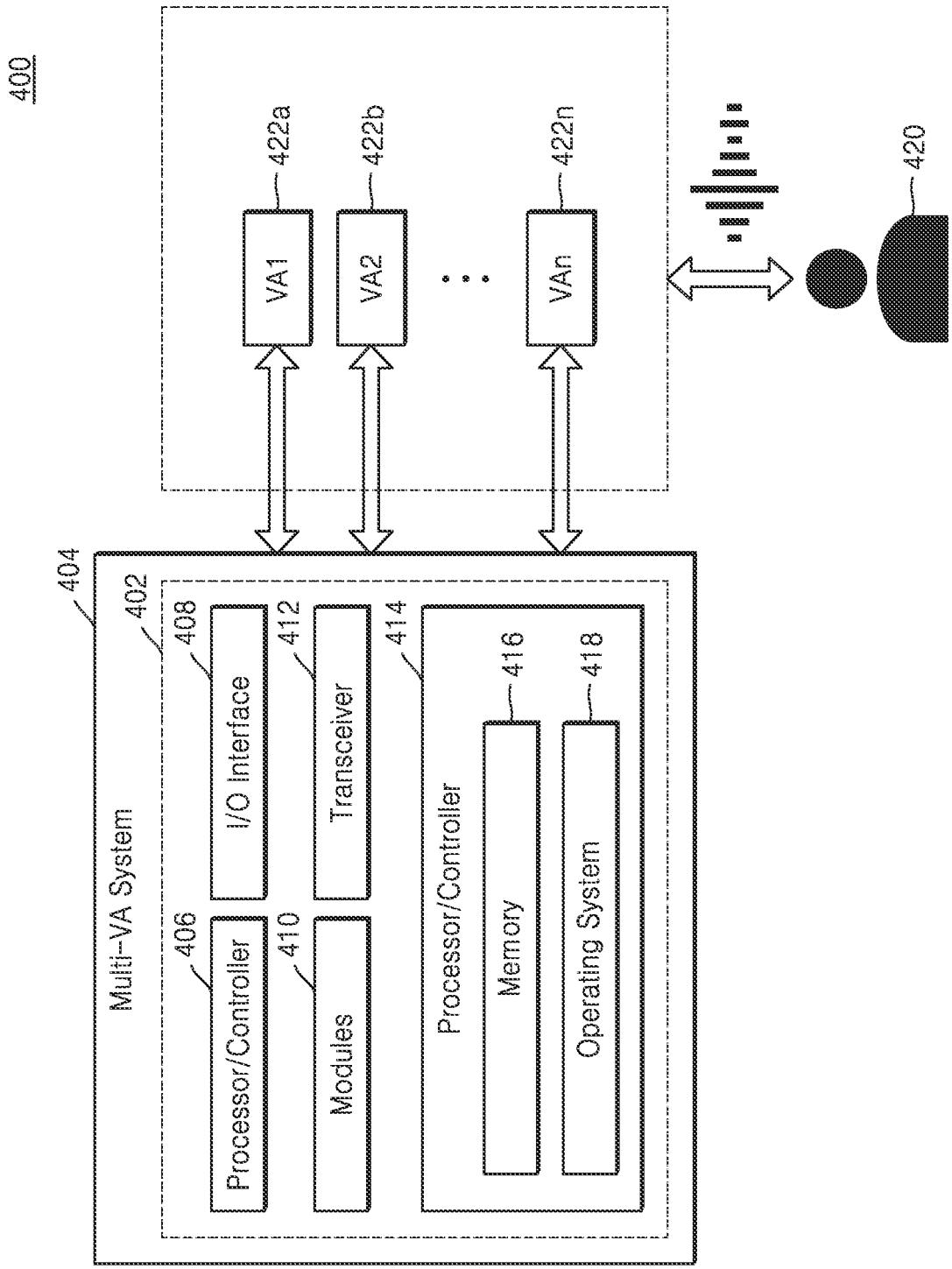
FIG. 4A illustrates a schematic block diagram of a multi-VA system for receiving a voice command via multiple voice assistant devices, according to an embodiment of the present disclosure.

FIG. 4A illustrates a schematic block diagram 400 of a multi-VA system 402 for receiving a voice command via multiple voice assistant devices, according to an embodiment of the present disclosure.

In an embodiment, the multi-VA system 402 may be included within one of a voice assistant device 404, or within a voice assistant device VA1-Van. In other embodiments, the multi-VA system 402 may be configured to operate as a standalone device or a system residing within a cloud-based network. In yet other embodiments, the system 402 may be included within a mobile device or an IoT device which includes a voice assistant device (such as 404). The voice assistant device may be configured as a mobile software application or as an operating system function of the mobile device. Examples of mobile device/voice assistant device/IoT device 404 may include, but not limited to, a mobile phone, a smart watch, a tablet, a laptop, a smart refrigerator, a smart AC, a smart coffee machine, or any other electronic device providing voice input capability required by a voice assistant. Similarly, examples of stand-alone voice assistant device 404 may include, but not limited to, a voice assistant, a smart watch, a laptop computer, a desktop computer, a Personal Computer (PC), a notebook, a tablet, a mobile phone, and e-book readers or any other smart device having a voice input capability required by a voice assistant.

In various embodiments of the present disclosure, the multi-VA system 402 within the voice assistant device 404 may be configured to dynamically control various VAs within a smart home environment to receive a user utterance/command. The multi-VA system 402 may further include a processor/controller 406, an I/O interface 408, modules 410, transceiver 412, and a memory 414. Also, the multi-VA system 402 may be in communication with one or more VAs, such as 422a-422n, which may be controlled via the multi-VA system 402 for listening to user utterances/commands, as discussed throughout this disclosure. The user 420 may communicate with the VA devices 422a-422n for providing voice commands in the environment. In an embodiment, the multi-VA system 402 may be included in a distributed manner within one or more such VA devices 422a-422n. If the multi-VA system 402 resides within one of the VA devices (e.g., device 422a), the other VAs (e.g., 422b-422n) may communicate with the device 422a where the multi-VA controller is residing in the environment.

In an embodiment, the memory 414 may be communicatively coupled to the at least one processor/controller 406. The memory 414 may be configured to store data, instructions executable by the at least one processor/controller 406. In some embodiments, the modules 410 may be included within the memory 414. The memory 414 may further include a database 416 to store data. The one or more modules 410 may include a set of instructions that may be executed to cause the system 402 to perform any one or more of the methods disclosed herein. The one or more modules 410 may be configured to perform the operations of the present disclosure using the data stored in the database 416, to control various VAs for listening to a user utterance/ command, when the user is on the move within a smart home environment comprising multiple VAs. In an embodiment, each of the one or more modules 410 may be a hardware unit which may be outside the memory 414. Further, the memory 414 may include an operating system 418 for performing one or more tasks of the multi-VA system 402 and/or voice assistant device 404, as performed by a generic operating system in the communications domain. The transceiver 412 may be capable of receiving and transmitting signals to and from the voice assistant device 404. The I/O interface 408 may include a speaker and/or a microphone to receive voice commands and provide a voice output to the user 420. Further, the I/O interface 408 may provide a display function and one or more physical buttons on the device 404 to input/output various functions of the voice assistant device 404. For the sake of brevity, the architecture and standard operations of operating system 418, memory 414, database 416, processor/controller 406, transceiver 412, and I/O interface 408 are not discussed in detail. In an embodiment, the database 416 may be configured to store the information as required by the one or more modules 410 and processor/ controller 406 to perform one or more functions to dynamically adjust a predefined listening time of the voice assistant device 404.

The I/O interface 408 may be configured to receive the voice inputs and non-speech sounds from the users within a surrounding environment and also configured to handle an audio or a video call which is either initiated on or is transferred from a connected mobile device. The voice commands may be handled by the I/O interface 408 in conjunction with a speaker, which may be configured to provide the voice output to the users (e.g., 420).

In an embodiment, the memory 414 may communicate via a bus within the system 402. The memory 414 may include, but not limited to, a computer-readable storage media, such as various types of volatile and non-volatile storage media including, but not limited to, random access memory, read-only memory, programmable read-only memory, electrically programmable read-only memory, electrically erasable read-only memory, flash memory, magnetic tape or disk, optical media and the like. In one example, the memory 414 may include a cache or random-access memory for the processor/controller 406. In alternative examples, the memory 414 is separate from the processor/controller 406, such as a cache memory of a processor, the system memory, or other memory. The memory 414 may be an external storage device or database for storing data. The memory 414 may be operable to store instructions executable by the processor/controller 406. The functions, acts or tasks illustrated in the figures or described may be performed by the programmed processor/controller 406 for executing the instructions stored in the memory 414. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing, and the like.

Further, the present disclosure contemplates a computer-readable medium that includes instructions or receives and executes instructions responsive to a propagated signal, so that a device (e.g., voice assistant device 404) connected to a network may communicate voice, video, audio, images, or any other data over a network. Further, the instructions may be transmitted or received over the network via a communication port or interface or using a bus (not shown). The communication port or interface may be a part of the processor/controller 406 or maybe a separate component. The communication port may be created in software or maybe a physical connection in hardware. The communication port may be configured to connect with a network, external media, the display, or any other components in system, or combinations thereof. The connection with the network may be a physical connection, such as a wired Ethernet connection or may be established wirelessly. Likewise, the additional connections with other components of the system 402 may be physical or may be established wirelessly. The network may alternatively be directly connected to the bus.

In an embodiment, the processor/controller 406 may include at least one data processor for executing processes in Virtual Storage Area Network. The processor/controller 406 may include specialized processing units such as, integrated system (bus) controllers, memory management control units, floating point units, graphics processing units, digital signal processing units, etc. In an embodiment, the processor/controller 406 may include a central processing unit (CPU), a graphics processing unit (GPU), or both. The processor/controller 406 may be one or more general processors, digital signal processors, application-specific integrated circuits, field-programmable gate arrays, servers, networks, digital circuits, analog circuits, combinations thereof, or other now known or later developed devices for analyzing and processing data. The processor/controller 406 may implement a software program, such as code generated manually (i.e., programmed).

The processor/controller 406 may be disposed in communication with one or more input/output (I/O) devices via the I/O interface 408. The I/O interface 408 may employ communication code-division multiple access (CDMA), high-speed packet access (HSPA+), global system for mobile communications (GSM), long-term evolution (LTE), WiMax, or the like, etc.

Using the I/O interface 408, the voice assistant device 404 may communicate with one or more I/O devices. For example, the input device may be an antenna, microphone, touch screen, touchpad, storage device, transceiver, video device/source, etc. The output devices may be a printer, fax machine, video display (e.g., cathode ray tube (CRT), liquid crystal display (LCD), light-emitting diode (LED), plasma, Plasma Display Panel (PDP), Organic light-emitting diode display (OLED) or the like), audio speaker, etc.

The processor/controller 406 may be disposed in communication with a communication network via a network interface. The network interface may be the I/O interface 408. The network interface may connect to a communication network. The network interface may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network may include, without limitation, a direct interconnection, local area network (LAN), wide area network (WAN), wireless network (e.g., using Wireless Application Protocol), the Internet, etc. Using the network interface and the communication network, the voice assistant device 404 may communicate with other devices. The network interface may employ connection protocols including, but not limited to, direct connect, Ethernet (e.g., twisted pair 10/100/1000 Base T), transmission control protocol/internet protocol (TCP/IP), token ring, IEEE 802.11a/b/g/n/x, etc.

The processor/controller 406 may identify voice or non-voice commands from the received speech sounds and non-speech sounds. A trained classifier model or various speech extraction techniques may be implemented to extract or identify the voice commands and the senders of the commands, such as user 420.

Figure 4B:
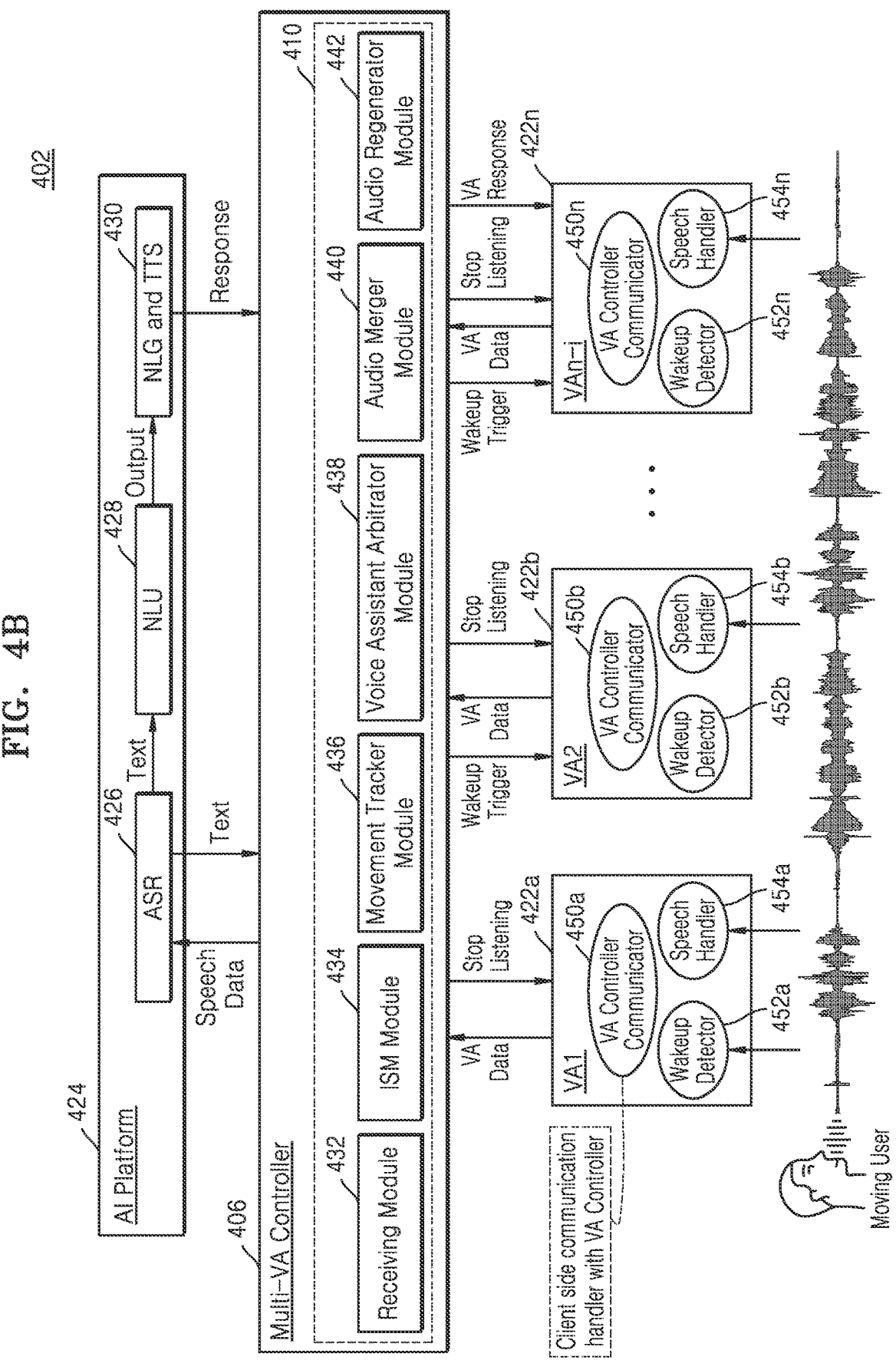
FIG. 4B illustrates another schematic block diagram of the multi-VA system for receiving a voice command via controlled multiple voice assistant devices, according to an embodiment of the present disclosure.
Figure 4C:
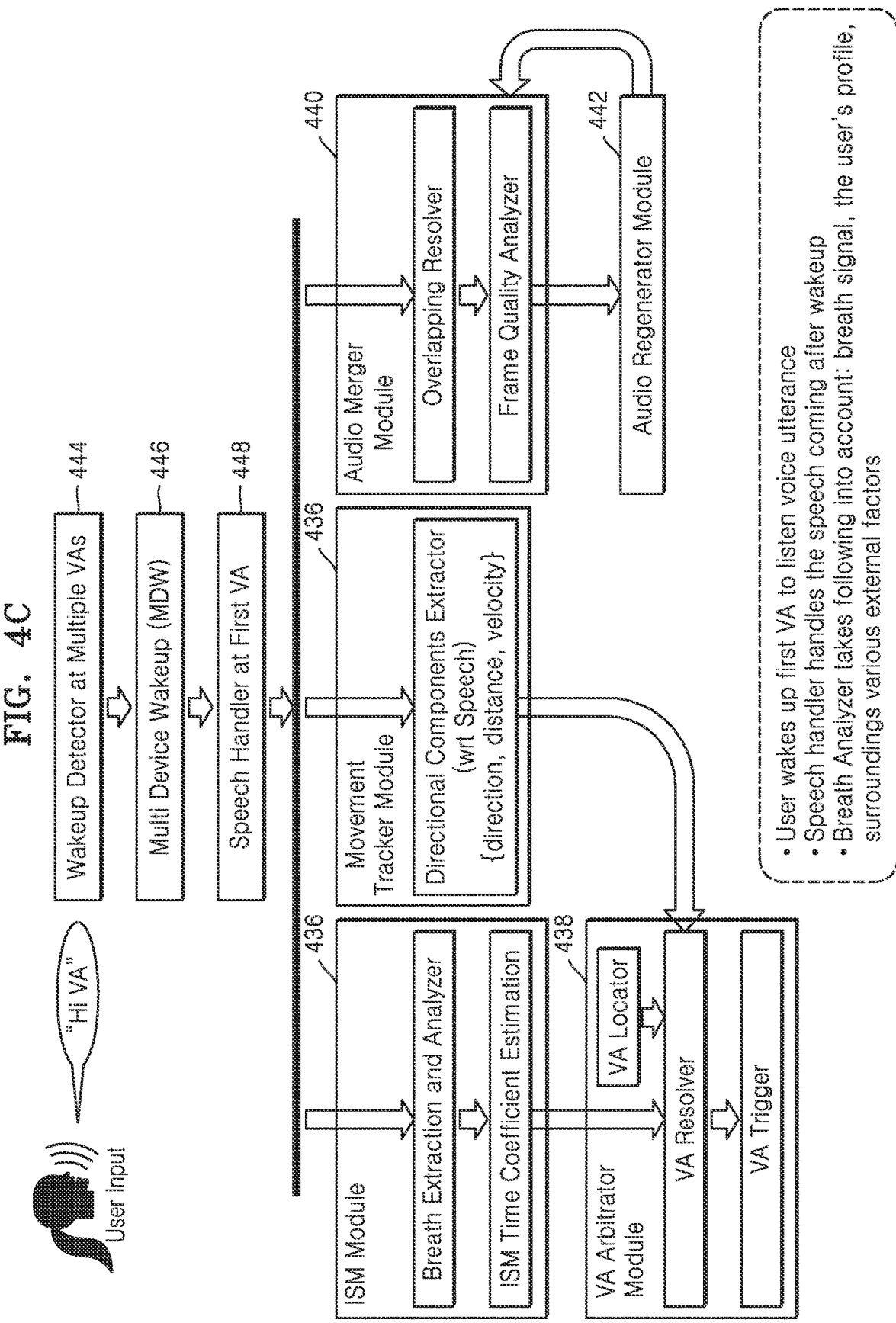
FIG. 4C illustrates yet another schematic block diagram of the multi-VA system 402 for receiving a voice command via controlled multiple voice assistant devices, according to an embodiment of the present disclosure.

FIG. 4B illustrates another schematic block diagram of the multi-VA system 402 for receiving a voice command via multiple voice assistant devices, according to an embodiment of the present disclosure. FIG. 4C illustrates yet another schematic block diagram of the multi-VA system 402 for receiving a voice command via multiple voice assistant devices, according to an embodiment of the present disclosure. FIGS. 4B and 4C are explained in conjunction with each other since they present components of the same system 402.

Referring to FIG. 4B, the one or more modules 410 may include a receiving module 432, an ISM module 434, a movement tracker module 436, a voice assistant arbitrator module 438, an audio merger module 440, and an audio regenerator module 442. The multi-VA controller 406 may be configured to operate in conjunction with the one or more modules 410 to perform one or more functions of the modules 410, as discussed hereinafter. Further, the multi-VA controller 406 may be configured to be in communication with multiple VAs 422a-422n. Each of the VAs 422a-422n may include at least a VA controller communicator 450a-450n, a wake-up detector 452a-452n, and a speech handler 454a-454n. As may be understood by a person skilled in the art, each VA 422a-422n may include one or more additional components similar to the components of system 402 discussed in FIG. 4A. For example, each VA 422a-422n may include a processor/controller, a memory, an I/O interface, and a transceiver.

FIG. 4C illustrates the multi-VA system 402 along with sequential flow of various inputs to the multi-VA system 402. As a first operation, the receiving module 432, at operation 444, may be configured to receive a hot word or wake-up input and analyze the hot word/wake-up input (e.g., "Hi VA"). The receiving module 432 may be configured to receive the hot word or speech input from the VA controller communicator 450a-450n. In an embodiment, the hot word/wake-up input may be received, detected, and analyzed by the VAs 422a-422n. Examples of hot words may include, but not limited to, "Hi<<VA name>>", "Hello <<VA name>>", and "OK<<VA name>>". The wake-up commands including the hot words may also be manually modified/configured by the users in the VA devices. In some embodiments, the receiving module 432 may be configured to filter the noise from the audio input and provide a noise-free output to the subsequent module(s).

Further, the receiving module 432 may receive speech, non-speech components, and/or breathing signal of the moving user 420, as captured by the VAs 422a-422n. Further, an artificial intelligence (AI) platform 424 may be included within the multi-VA system 402 which may process the received speech data using automatic speech recognition (ASR) 426, natural level understanding (NLU) 428, natural language generation (NLG) and text to speech (TTS) 430. The ASR 426 may be configured to use the Machine Learning or Artificial Intelligence (AI) technology to process human speech into readable text. As widely known, the NLU 428 is a branch of natural language processing (NLP), which helps computers understand and interpret human language by breaking down the elemental pieces of speech. While speech recognition captures spoken language in real-time, transcribes it, and returns text, NLU goes beyond recognition to determine a user's intent. The NLG 430 is a branch of artificial intelligence (AI) that generates language as an output on the basis of data as input. Further, the TTS 430 is a type of assistive technology that reads digital text aloud. It's sometimes called "read aloud" technology. Since, ASR 426, NLU 428, and NLG and TTS 430 are widely known techniques in the domain of speech processing, these have not been discussed in detail here for the sake of brevity.

Once the wake-up detector or hot word is detected at operation 444, the multi-device wake-up detector 452a-452n may be initiated at operation 446. For example, the multi-device wake-up detector 452a may wake up the first VA 422a to listen to the voice command being provided by the user. Subsequently, at operation 448, the speech handler 454a within the VA 422a may be configured to capture the speech/utterance of the user and the breathing pattern associated with the user while the user speaks. In an embodiment, the speech and the breathing pattern captured by the VA 422a may be shared with the receiving module 432 for further processing.

In an embodiment, the ISM module 434, using a breath extraction and analyzer, may be configured to determine user's intention to speak more based on a breathing pattern of the user detected using the first audio input at the first VA 422a. The breath extraction and analyzer may be configured to take breath signal, the user's profile, and surroundings various external factors into consideration to determine user's intention to speak more. Further, the ISM module 434 may be configured to determine an adjusted listening time based on an ISM time coefficient estimation. In an embodiment, the ISM time coefficient may be determined in the range of −1 to +1. Further, the adjusted listening time may be determined as 0.2*a speech threshold. In an embodiment, the speech threshold may be 600 ms. The details of determination of ISM coefficient and adjusted listening time are discussed in detail in the Indian Patent Application No. 202211016620, filed on Mar. 24, 2022, which is incorporated herein by reference in its entirety. For the sake of brevity, these details of ISM coefficient and adjusted listening time are not discussed here in detail.

Further, the movement tracker module 436 may be configured to track the position of moving user with respect to available VAs in the smart/IoT environment. The movement tracker module 436 may include a directional components extractor, which may be configured to extract direction, distance, and velocity of the user with respect to the speech/utterance of the user. Specifically, the movement tracker module 436 may be configured to detect track distance, direction, and speed of the moving user 420 based on the captured audio/speech of the user. In response to detecting the user movement, the movement tracker module 436 may be configured to activate the VA arbitrator module 438.

Further, the VA arbitrator module 438 may be configured to determine/select a winner VA when two or more VAs are close by in the smart home/IoT environment. The VA arbitrator module 438 may include a VA locator to locate each VA within the smart/IoT environment, a VA resolver, and a VA trigger. The VA locator may be configured to maintain and provide device location information in the form of x and y coordinates. Further, the VA locator may be configured to dynamically update the device location information using widely known distance measuring techniques for measuring distance between Bluetooth devices. Also, the VA resolver of the VA arbitrator module 438 may be configured to determine which VA to be awaken up next based on user's position/movement, when user is giving voice command while moving within the smart home/IoT environment. In an embodiment, the VA arbitrator module 438 may be configured to decide when to wake-up a next VA and when to sleep the current active VA based on speech power, ISM Coefficient, and movement values. Specifically, the VA trigger of the VA arbitrator module 438 may be configured to trigger the VA wakeup command for the next VA, and VA sleep command for the current VA. After waking up the next VA, when speech power is more on the next VA, the VA trigger of the VA arbitrator module 438 may set the previous VA to sleep state. For example, the VA arbitrator module 438 may awake 422b using a wake-up trigger, and subsequently, the VA 422b may initiate capturing of speech and/or breath signal of user for further analysis in conjunction with the multi-VA system 406.

Furthermore, the audio merger module 440 may be configured to merge the audio coming from different VAs and also configured to remove overlapping sections of audio detected by the different VAs 422a-422n. Finally, the audio regenerator module 442 may be configured to regenerate lost and/or corrupted signals (start/end of words). The audio merger module 440 may include an overlapping resolver and a frame quality analyzer, which are discussed later through this disclosure.

Figure 5:
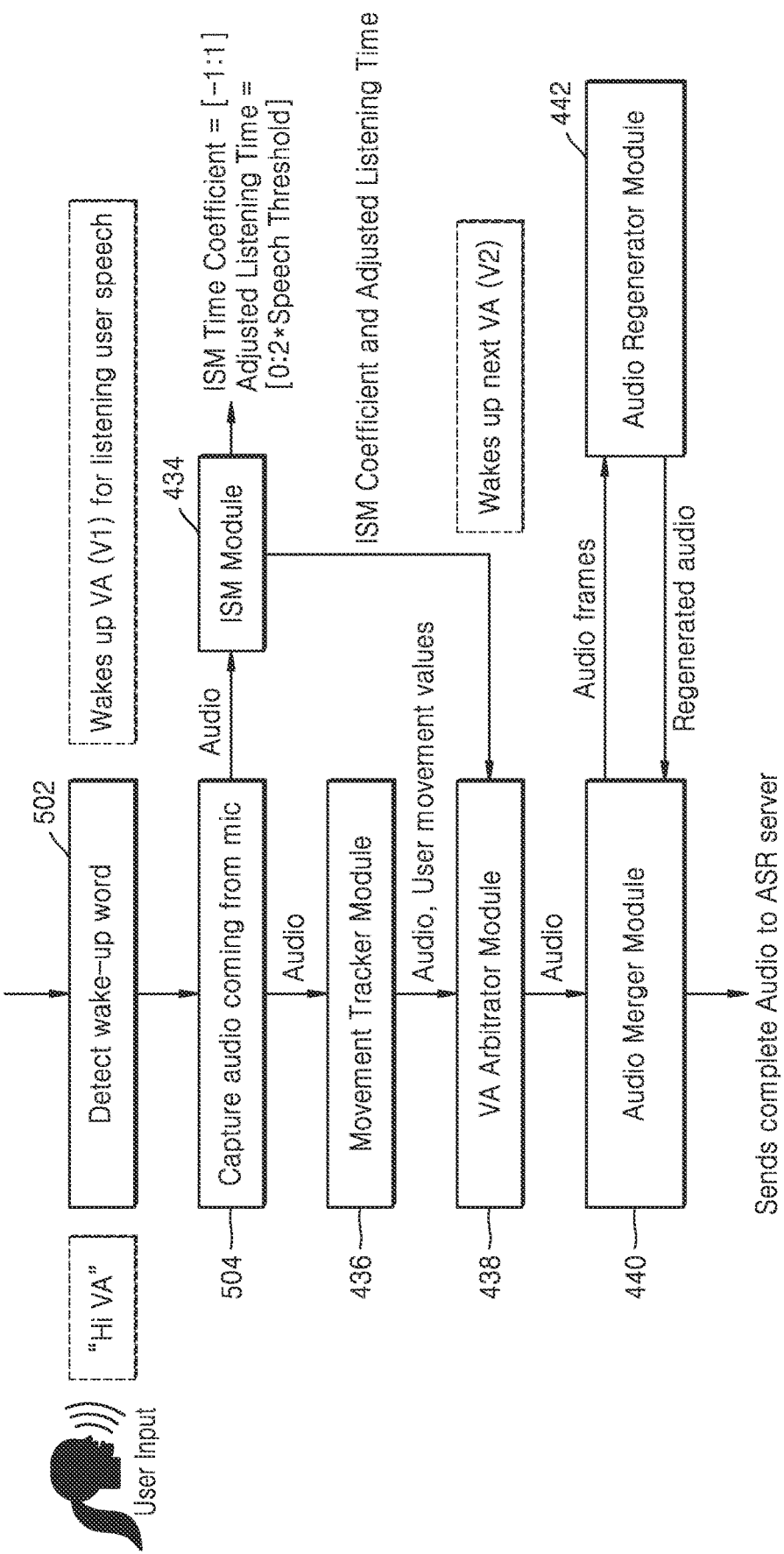
FIG. 5 illustrates an process flow for receiving a user command via multiple VAs, in accordance with an embodiment of the present disclosure.

FIG. 5 illustrates a process flow 500 for receiving a user command via multiple VAs, in accordance with an embodiment of the present disclosure. As shown, at operation 502, raw audio is detected by a first VA in the smart/IoT environment which includes a hot word/wake-up word (e.g., "Hi<<VA name>>"). In response to detection of the hot word, the first VA is awaken for listening to user speech and capturing breathing pattern. Subsequently, at operation 504, the audio coming from mic of the first VA is captured after the hot word detection. The speech and breathing pattern are then passed to the ISM module 434, which determines an ISM time coefficient. Also, the movement tracker module 436 is configured to track, using captured audio, user's movement (direction, distance and speed) with respect to the VA1 and may activate the VA arbitrator module 438 when the user movement is detected. The VA arbitrator module 438 may then determine when to wake-up the next VA and sleep the current active VA based on Speech Power, ISM Coefficient and movement values. Once the other VA(s) are awaken, the complete speech may be merged via the audio merger module 440 configured to merge audio coming from different VAs (in this case V1 and V2), and remove overlapping sections, and regenerating lost/corrupted signal using the audio regenerator module 442. The complete audio may finally be sent to the ASR server for processing and execution of command.

Figure 6:
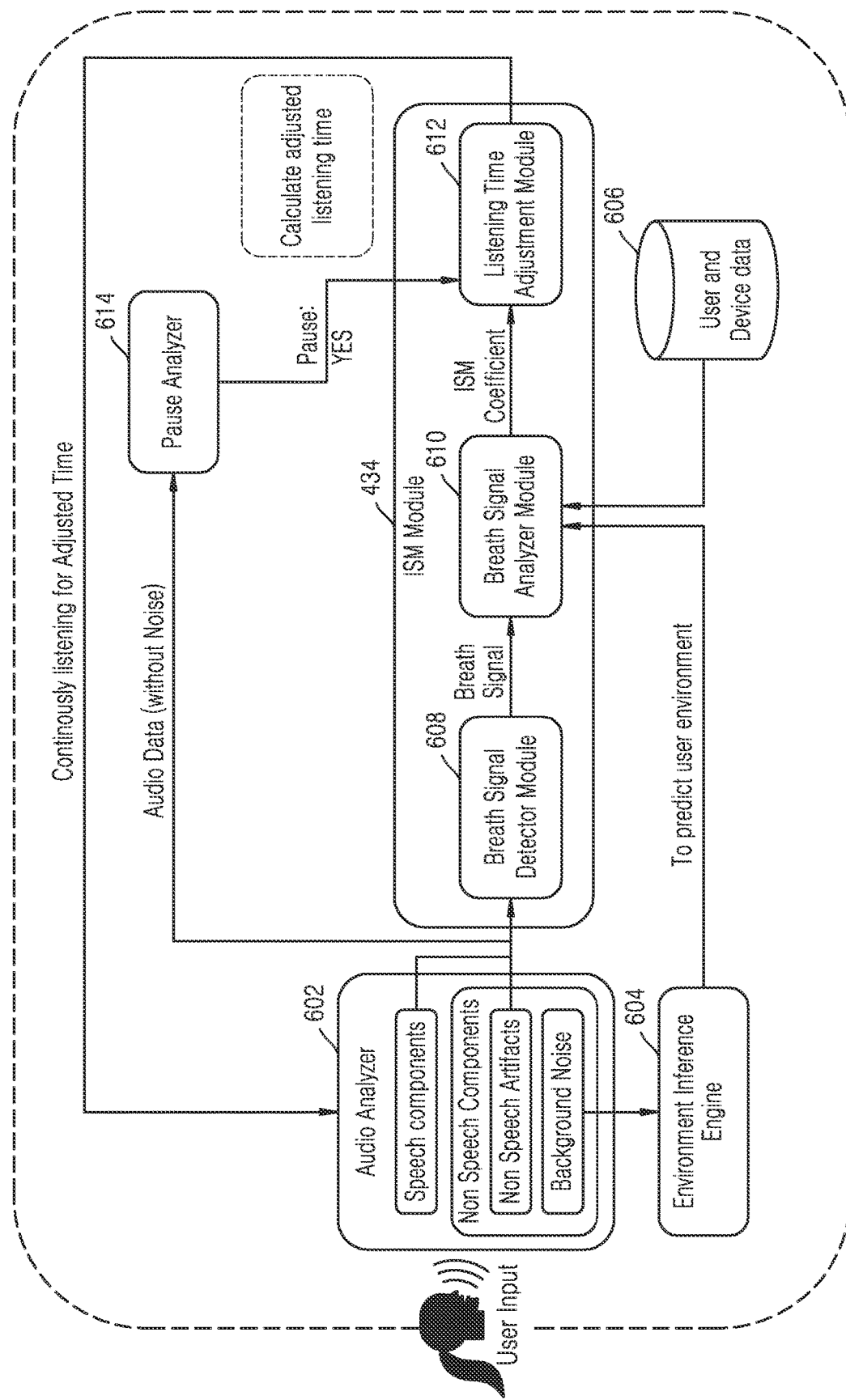
FIG. 6 illustrates a detailed ISM module configured to determine user's intention to speak more based on a breathing pattern of the user, according to an embodiment of the present disclosure.

FIG. 6 illustrates a detailed ISM module 434 configured to determine user's intention to speak more based on a breathing pattern of the user, according to an embodiment of the present disclosure.

Once the speech/audio input is received, an audio analyzer 602 may be configured to extract one or more of a speech component and a non-speech artifact from the audio input which may be used to determine breathing patterns and continuation of utterances for the conversation (follow-up utterances). In an embodiment, the captured speech signal may be evaluated for estimating the breath signal in an asynchronous manner. Also, the audio analyzer 602 may be configured to provide the captured noise within the non-speech components to an environment inference engine 604 which may be configured to predict surrounding user environment. The ISM module 434 may include a breath signal detector module 608, a breath signal analyzer module 610, and a listening time adjustment module 612.

The breath signal detector module 608 may include a neural network model configured to predict a corresponding breath signal from an input speech vector received from the audio analyzer 602. Further, breath signal analyzer module 610 may be configured to identify the user based on the detected breathing pattern or one or more other user specific characteristics/parameters received from the user and device data 606. In an embodiment, the user's breathing pattern may be matched to one or more pre-stored user profiles. The pre-stored user's profile may include, but not limited to, voice input, breathing pattern, device profile and user's age. In other embodiments, the user's profile may be determined based on voice input detected by the receiving module 432. In an embodiment, the speech component comprises one or more of phonemes and graphemes. The non-speech artifact comprises one or more of breathing sounds, non-lexical speaker noise, and background noise. Further, the breath signal analyzer module 610 may be configured to predict an ISM coefficient from the input breath signal vector received from the breath signal detector module 608.

In an embodiment, the breath signal detector module 608 may be configured to determine a user breathing pattern signal based on the one or more of the speech component and the non-speech artifact. In an embodiment, the user breathing pattern is determined using one of an audio spectrogram and a waveform analysis. Further, the user breathing pattern may be determined based on the at least one speech component and the at least one non-speech artifact using a neural network model. In an embodiment, the estimation of breath signals or patterns may be based on a regression model. The breathing pattern may be determined based on an input speech feature vector corresponding to the voice input, and the approach used may be speech feature vector-to-signal regression. Further, the breathing pattern of the user may be output as a breath vector for further processing, as discussed herein. In an embodiment, the user breathing pattern identification may include identifying a duration and an amplitude of at least one inhalation and exhalation of the user while providing the audio input to the voice assistant device.

In an embodiment, the breath signal or pattern may be determined based on labeled training data stored in a neural network model. Further, speech Log Mel Filters may be used to determine an output feature vector corresponding to breath signal or pattern. An set of speech samples with associated breath signal vector is illustrated in Table 1 below:

TABLE 1

| Speech Sample | Breath Signal Vector (Sensor Data) |
| --- | --- |
| Speech Wave 1 | [0.12, 0.34, 0.5, 0.25, . . . , 0.68] |
| Speech Wave 2 | [0.10, 0.24, 0.48, 0.20, . . . , 0.3] |
| . . . | . . . |
| Speech Wave n | [0.09, 0.20, 0.30, 0.15, . . . , 0.66] |

A corresponding feature vector associated with the user's breathing pattern or signal is derived as shown in Table 2 below. A feed forward neural network with back propagation may be used to determine breath signal feature vectors.

TABLE 2

| Speech Log Mel Filters (186 × 13) | Breath Signal Vector |
|---|---|
| [17.72300, −5.91531, −5.75788, . . . 8.81263] | [0.12, 0.34, 0.5, 0.25, . . . , 0.68] |
| [19.1679, −4.93061, −8.4695 . . . , 12.53456] | [0.10, 0.24, 0.48, 0.20, . . . , 0.3] |
| . . . | . . . |
| [19.92615, −9.81114, −20.52169 . . . 9.1371] | [0.09, 0.20, 0.30, 0.15, . . . , 0.66] |

Additionally, the breath signal analyzer module 610 may be configured to identify one or more attributes, based on inputs received from the environment inference engine 604, that impact the user breathing pattern based on at least one non-speech component, captured from the surrounding environment and the voice assistant device. Such non-speech components are captured to identify parameters/components that may impact the breathing pattern of users for the continuation of conversation (follow-up utterances). In an embodiment, the at least one non-speech component comprises one or more of environment noise, microphone channel noise, and non-speech artifacts (e.g., non-lexical speaker noise such as hum, hmm, aaa, bb, etc. along with breathing sounds). Further, the one or more attributes comprise one or more of environmental parameters, user data (e.g., gender), and voice assistant device data (e.g., device GPS coordinates). In an embodiment, the environment inference engine 604 may be configured to use a neural net regression model for identifying environmental parameters.

Further, a pause analyzer module 614 may be configured to receive audio data without noise from the audio analyzer 602 and may be configured to detect a pause in the speech. Upon detection of a pause, the ISM module comprising the breath signal analyzer module 610 and a listening time adjustment module 612 may be configured to analyze user's breath to dynamically adjust the pre-configured listening time in order to continue listening for user's utterance or follow-up commands without requiring a wake-up/trigger command comprising any hot word.

In an embodiment, the pause analyzer module 614 may be configured to detect a pause of a specific time duration after receiving the audio input. The pause analyzer module 614 may be configured to receive the audio input without noise component from the audio analyzer 602. In some embodiments, the pause analyzer module 614 may not be required to perform further actions as discussed herein below. For example, the speech or voice input may be analyzed by the breath signal analyzer module without or before detection of any pause signal. In an embodiment, the pause duration may be specific to each user. In particular, the pause duration detection may be based on identification of a user. Further, in an embodiment, the pause may correspond to a pause between two words of the language spoken by the user. In another embodiment, the pause may correspond to a pause between two sentences of the spoken language. The identification of words and sentences of the spoken language is well known in the art, and is thus not discussed in detail here for the sake of brevity.

Further, after detecting a pause in the audio input, the ISM module 434 (specifically the breath signal analyzer module 610 may determine whether a user's intention is to continue the conversation based on an analysis of the user breathing pattern and the one or more attributes. In an embodiment, the determining comprises determining an intention-to-speak more (ISM) coefficient based on the analysis of the user breathing pattern and the one or more attributes. The user's profile may also be considered while determining the ISM coefficient, and hence, the ISM coefficient may be specific to each user. In an embodiment, the ISM coefficient may have values from −1 to 0 indicating that the user does not have an intention to speak more, the values from 0 to 1 may indicate that the user has an intention to speak more which may require an adjustment to the current listening time of the voice assistant device. In another embodiment, it may be determined whether the ISM coefficient is monotonically increasing or decreasing. In case of monotonic decrease in the ISM coefficient over time, it may be determined/concluded that the user's tendency to speak is declining. On the other hand, in case of monotonic increase in the ISM coefficient over time, it may be determined/concluded that the user's tendency to speak is advancing. In an embodiment, the determination of whether the user's intention is to continue the conversation is based on the identified duration and the amplitude of the at least one inhalation and exhalation of the user while providing the input to the voice assistant device. More specifically, the determination of whether user's intention is to speak more is based on the user's breathing pattern, environmental parameters, and user device data to dynamically adjust the voice assistant's mic listening (wake-up) time.

In one embodiment, the breath signal ISM coefficient values may be determined based on labeled training data stored in a neural network model. An set of breath signal vectors and corresponding ISM coefficient values is illustrated in Table 3 below:

TABLE 3

| Breath Signal Vector | External Factor | ISM Coefficient |
|---|---|---|
| [0.12, 0.34, 0.5, 0.25, . . . , 0.68] | Environment, user Profile, . . . | [0.68] |
| [0.10, 0.24, 0.48, 0.20, . . . , 0.3] | Environment, user Profile . . . | [−0.45] |
| . . . | . . . | . . . |
| [0.09, 0.20, 0.30, 0.15, . . . , 0.66] | Environment, user Profile . . . | [0.58] |

An feature vector output based on the labeled data stored in neural network model may be derived as indicated in Table 4 below. A feed forward neural network with back propagation may be used to determine feature vectors associated with ISM coefficients.

TABLE 4

| Breath Signal Vector | External Factor Feature Vector | ISM Coefficient |
|---|---|---|
| [0.12, 0.34, 0.5, 0.25, . . . , 0.68] | [0.8, 0.5 . . . 0.32] | [0.68] |
| [0.10, 0.24, 0.48, 0.20, . . . , 0.3] | [0.6, 0.4 . . . 0.2] | [−0.45] |
| . . . | . . . | . . . |
| [0.09, 0.20, 0.30, 0.15, . . . , 0.66] | [0.1, 0.8 . . . 0.72] | [0.58] |

In one embodiment, the inhalation and exhalation durations may be pre-stored in the database to derive the ISM coefficient. An set of values is shown here in Table 5 below:

TABLE 5

| Parameter | Time Range (Second) |
|---|---|
| Speech exhalation duration | Several seconds as per Speech flow |

TABLE 5-continued

| Parameter | Time Range (Second) |
|---|---|
| Normal inhalation duration | 1 <= T <= 1.5 |
| Normal exhalation duration | 1.5 <= T <= 2.0 |
| Normal inhalation pause duration | 1.0 <= T <= 2.0 |
| Normal exhalation pause duration | 1.0 <= T <= 2.0 |
| Quick exhalation duration | 0 < T < 1.5 |
| Quick inhalation duration | 0 < T < 1.0 |
| Breath hold duration | T > 2.0 |

In an embodiment, the listening time adjustment module 612 may be configured to dynamically adjust the predefined listening time of the voice assistant device to continue listening for voice commands in the conversation based on a determination that the user's intention is to continue the conversation. The predefined listening time of the voice assistant device is one of a default listening time set during manufacturing of the voice assistant device, and a dynamically set listening time different from the default listening time. To dynamically adjust the predefined listening time, the listening time adjustment module 612 may be configured to determine a listening duration based on the estimated ISM coefficient when the pause analysis is detected by the pause analysis module. In an embodiment, if the current speech threshold is 600 ms, then the listening time may be adjusted from 0 to 2*speech threshold, i.e., from 0 to 1200 ms. In another embodiment, the adjusted listening time may be derived based on the following formula:

Adjusted Listening Time=Speech Threshold*(1+ISM Coefficient)

In some embodiments, the listening time may only be adjusted based on a comparison with a pause duration. For example, the listening time may be adjusted if the pause duration is less than 180 seconds. If the pause duration is more than 180 seconds, than the voice assistant may be configured to stop listening to user voice inputs.

In an embodiment, the dynamically adjustment of the predefined listening time of the voice assistant device is based on the specific time duration of the pause to continue listening for voice commands in the conversation after the pause. In another embodiment, the dynamically adjusting predefined listening time of the voice assistant device is based on the ISM coefficient and a speech threshold value. Further, in some embodiments, the voice assistant device may be configured to adjust the predefined listening time for listening to user voice inputs till detection of a subsequent pause.

More specifically, in an embodiment, the listening time adjustment module 612 may be configured to eliminate a need of repeatedly waking-up the voice assistant device by suspending a requirement of receiving the hot word to continue listening for the voice commands.

In an embodiment of the present disclosure, the listening time adjustment and/or elimination of a need for wake-up/hot word may be performed for a next VA, as the user is on the move during utterance.

Figure 7:
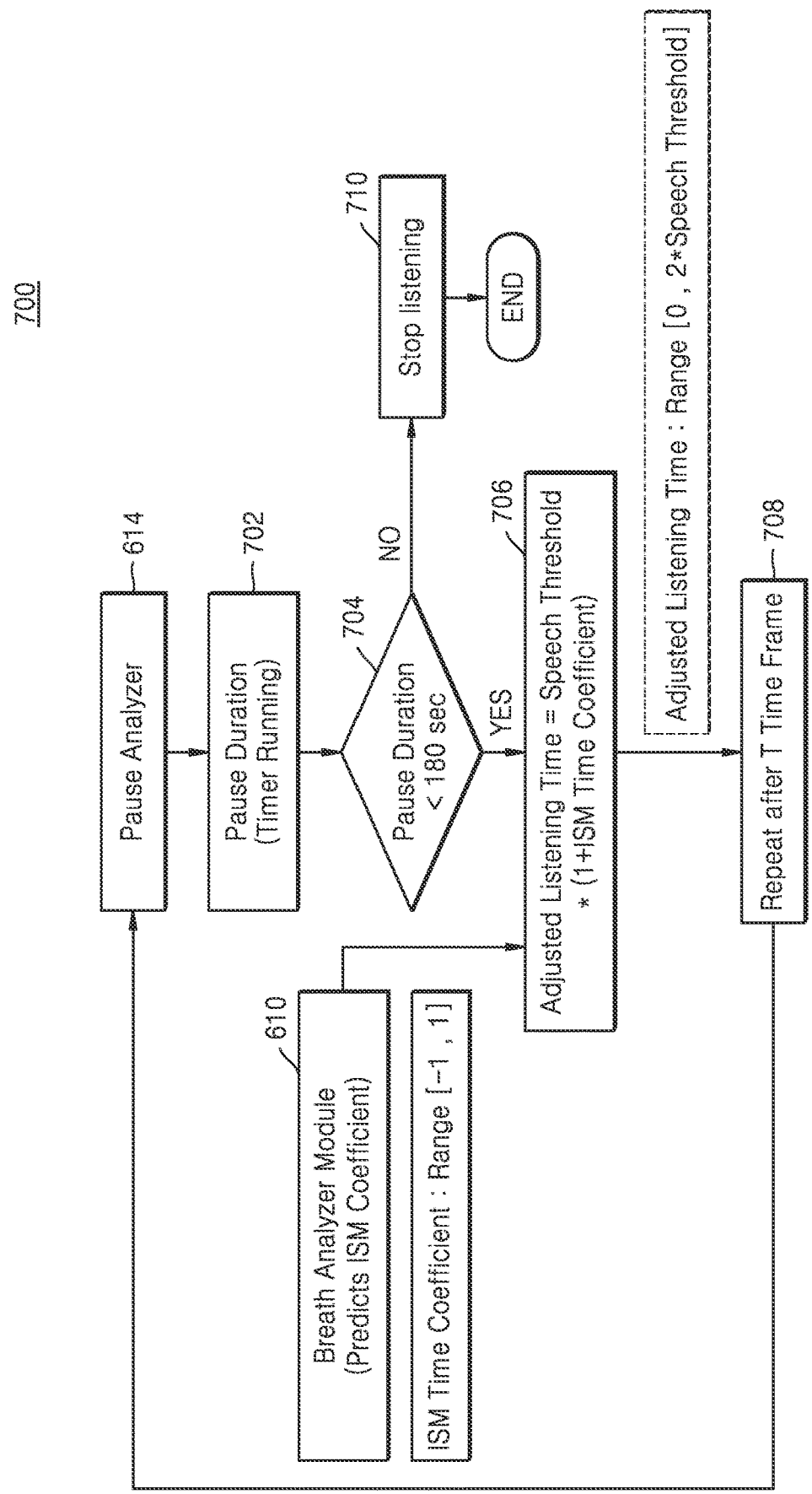
FIG. 7 illustrates a process flow of an listening time adjustment module, according to an embodiment of the present disclosure.

FIG. 7 illustrates a process flow 700 of a listening time adjustment module, depicting that when the pause duration is lesser than 180 sec, an adjusted listening time is determined, in a manner as discussed above. If the pause duration is greater than 180 sec, the system may stop listening. As shown, at operation 702, a pause duration is measured based on a running timer. At operation 704, upon detecting that the pause duration is lesser than 180 secs, an adjusted listening time may be determined at operation 706. The adjusted listening time may be determined based on ISM time coefficient received from the breath signal analyzer module 610 and a predefined speech threshold. In an embodiment, the ISM coefficient may be in the range of −1 to +1. Further, the adjusted listening time may be in a range of 0 to 2*speech threshold. This process may be repeated after every T time frame, as shown in operation 708. In case the pause duration is greater than 180 seconds, the receiver module may stop listening to the user's voice as shown in operation 710.

Figure 8:
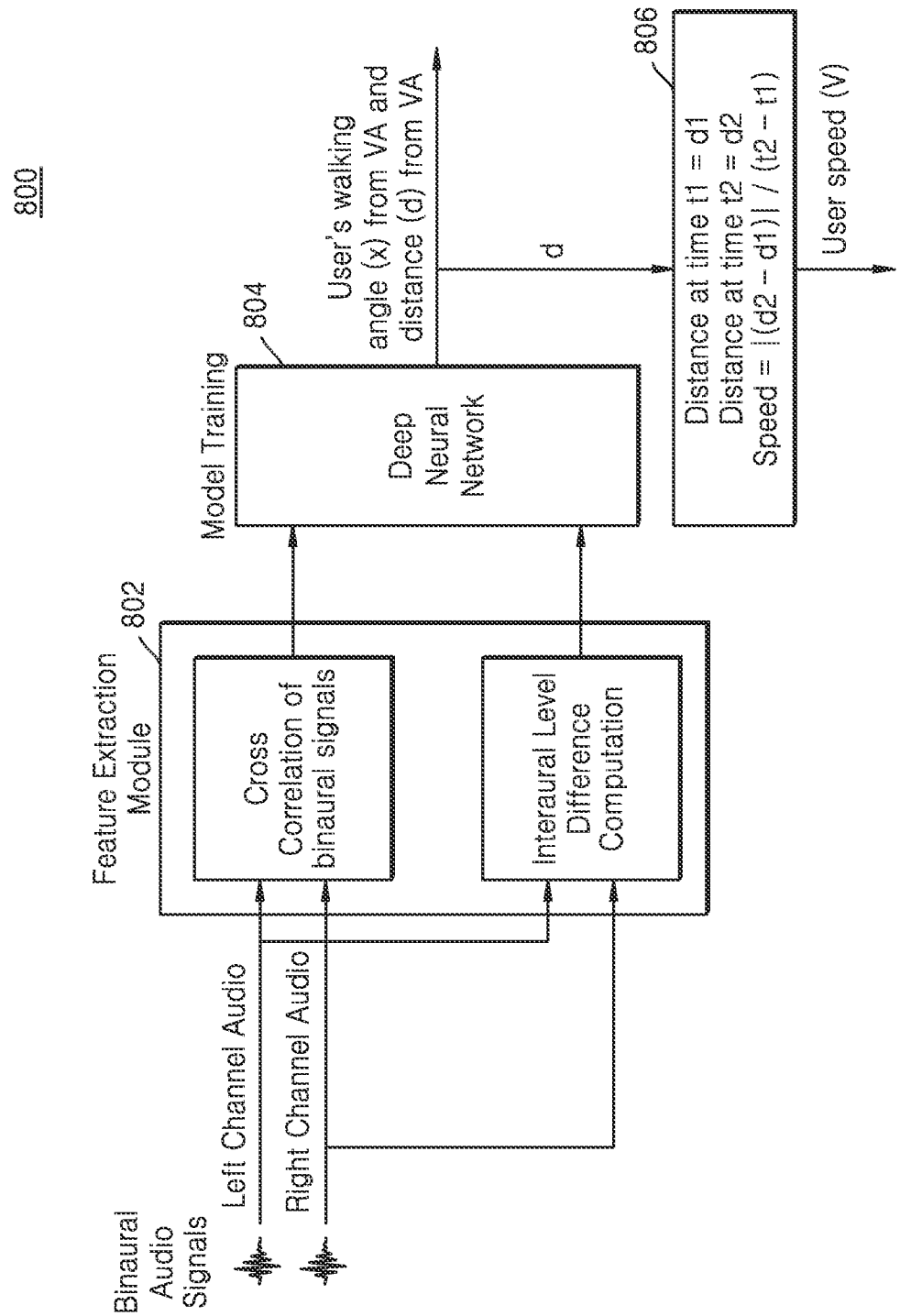
FIG. 8 illustrates a detailed block diagram of movement tracker module, in accordance with an embodiment of the present disclosure.

FIG. 8 illustrates a detailed block diagram 800 of movement tracker module 436, in accordance with an embodiment of the present disclosure. Based on the audio input detected by a first VA, the binaural audio signals, i.e., the left and right channel audios may be detected, and features may be extracted from the channel audios.

The feature extraction module 802 may be configured to perform cross correlation of binaural signals and interaural level difference computation of left and right channel audios. The first extracted training feature is associated with two signal channels' cross correlation series in time domain. Further, the other training feature is associated with Interaural Level Difference (ILD) difference between two signal channels. The ILD value carries information about the relationship between the intensity levels of the two channels of the binaural signals as received by the mics.

Further, a deep neural network (DNN) 804 may be trained to map the 82-dimensional feature vector to their corresponding direction-distance labels. The DNN here is a fully connected neural network with 8 hidden layers of 100 neurons each. For each hidden layer, a Rectified Linear Unit (Relu) activation function may be used. The datasets may be classified into multiple direction and distance classes. The output layer is a softmax classifier which outputs a probability value for each of the possible direction and distance classes. Specifically, the user's walking angle from a VA and distance (d) from the VA may be determined. Further, based on the determined distance, distance values at different timestamps can be used to calculate the speed of moving user may be performed at 806.

Figure 9:
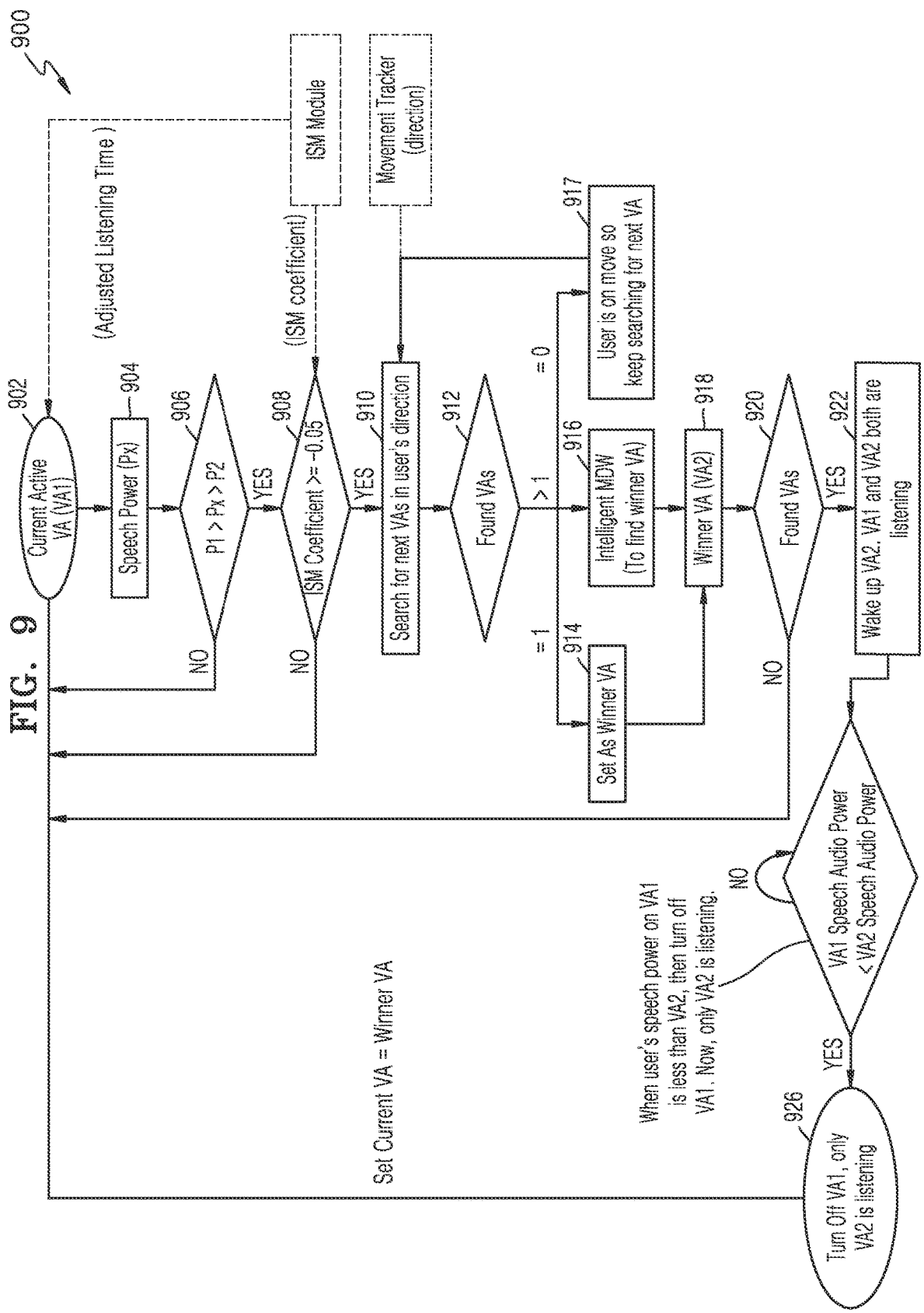
FIG. 9 illustrates a flow diagram associated with a VA arbitrator module to select another VA in the smart/IoT environment, according to one embodiment of the present disclosure.

FIG. 9 illustrates a flow diagram 900 associated with a VA arbitrator module 438 to select another VA in the smart/IoT environment, according to an embodiment of the present disclosure.

At operation 902, as per adjusted listening time, the active VAs will continue to listen further or will go off to sleep. Further, at operation 904, the speech power may be determined for the active VA. In an embodiment, at operation 906, it may be determined whether the speech power lies within the range of P1 to P2 (e.g., P1~55 DB, P2~50 DB). At operation 908, it may further be determined whether the ISM coefficient is >=−0.05, as received from the ISM module, the multi-VA system may start searching for next VA in user's direction at operation 910. The user's direction may be received from the movement tracker module. An mapping of average speech power level as a function of listening/recording distance is provided here in below Table 6.

TABLE 6

| Listening distance [m] | Normal | Raised | Loud | Shout |
|---|---|---|---|---|
| 0.25 | 70 | 76 | 82 | 88 |
| 0.5 | 65 | 71 | 77 | 83 |
| 1 | 58 | 64 | 70 | 76 |
| 1.5 | 55 | 61 | 67 | 73 |
| 2 | 52 | 58 | 64 | 70 |

TABLE 6-continued

| Listening distance [m] | Normal | Raised | Loud | Shout |
|---|---|---|---|---|
| 3 | 50 | 56 | 62 | 68 |
| 5 | 45 | 51 | 57 | 63 |

To elaborate operation 908, the ISM coefficient may be compared to a predetermined value. For example, if the ISM coefficient<−0.05, it indicates that the user will not speak much, so the multi-VA system will keep on listening to the user utterance with VA1 and does not search for next VA. However, if ISM coefficient>−0.05, it indicates that user will speak comparatively more than the time of ISM coefficient being less than −0.05, and current VA may not be able to fully listen to user utterance. So, the VA arbitrator module may start searching for a next VA at operation 910. This will result in much more efficient system as overlapping will be reduced and VAs wakeup/sleep will be reduced.

In the next operation 910, the VA arbitrator module may be configured to search for a next VA in the direction of user's movement with assistance from movement tracker module providing the user's direction of movement. If the VA arbitrator module finds more than 1 VA at operation 912 while searching, an intelligent multi-device wake-up (MDW) module 446 may be triggered to find a winner VA at operation 916. In case of finding only 1 other VA, a trigger to wake up such VA may be sent from the VA arbitrator module at operation 914. If no other VA is found, the VA may keep listening on current active VA till the hearable audio is coming and execute the command accordingly at operation 917. At operation 918, a final winner VA is determined to trigger wake up to listen to remaining user command.

Subsequently, at operation 920, it may be determined whether user's speech power is going below a predefined speech threshold. When user's speech power goes below a predefined speech power level P2, the winner VA may be awaken for listening to remaining user utterance at operation 922. Both the VAs (VA1 and VA2) will be listening at this stage. Next, at operation 924, the VA arbitrator module may be configured to continuously determine whether the VA1's Speech Audio Power is lesser than VA2 Speech Audio Power. When this becomes true, then the VA1 shall be turned OFF at operation 926, and only VA2 will keep listening to user. The process may be repeated till the user is speaking.

Figure 10:
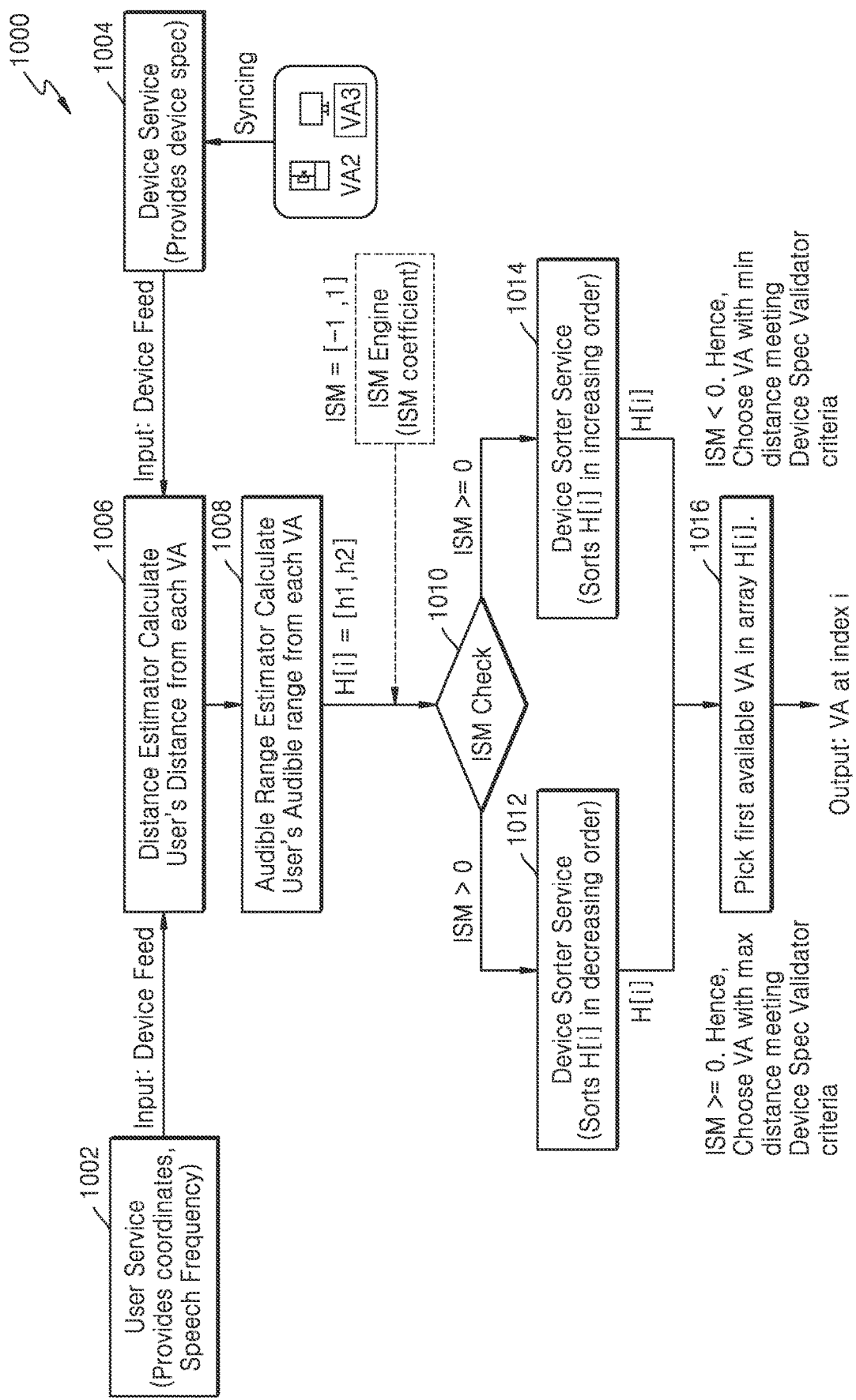
FIG. 10 illustrates a flow diagram associated with a multi-device wake up (MDW) to select a winner VA from multiple VAs found in the smart/IoT environment, according to one embodiment of the present disclosure.

FIG. 10 illustrates a flow diagram 1000 associated with a multi-device wake up (MDW) 446 to select a winner VA from multiple VAs found in the smart/IoT environment, according to an embodiment of the present disclosure.

As shown, in the first operation 1002, a user service may provide data associated with coordinates and speech frequency of the user. Similarly, at operation 1004, a device service may provide device (VA) specific data. The user service data may include:

User Feed: {User_speech_freq: [$f1,f2$], User_loc: [$x1, y1$]}

Further, an device feed may include:

{mic_quality: $q1$, mic freq: [$f1,f2$], audible_range: $a1$, Device_loc: [$x2, y2$]}

Based on the user service data, at operation 1006, a user distance may be estimated from each VA using a vector determination. An distance vector may be determined as:

Vector: $D[i]=\text{sqrt}((x1-x2)^2+(y1-y2)^2)$

Next, at operation 1008, the user's audible range from each VA may be determined using the vector:

Vector: $H[i]=D[i]+\text{audible\_range}$

Further, at operation 1010, the ISM check may be performed, and the VA devices may be sorted in a decreasing and increasing order of preference in operations 1012 and 1014 respectively based on ISM's value being less than and greater than equal to 0. A negative ISM value of ISM being less than 0 may signify that there are comparatively more chances that the user would not speak much, so a VA with a less active range may also be selected as the next VA (i.e., winner VA) for listening to remaining conversation of the user. Once the devices are sorted, the VA devices' specification may be validated. In an embodiment, the speech frequency in range of mic freq. and mic quality>=MIC_QUALITY_THRESHOLD (e.g., 1) may be validated. On a scale of 0 to 2, the MIC_QUALITY_THRESHOLD, 0 may be the worst, while 2 may be the best MIC QUALITY. At operation 1016, a VA may then be chosen based on ISM values being compared to zero. If ISM is greater than or equal to zero, then VA with maximum distance meeting device specification validation criteria may be chosen. However, if ISM is lesser than zero, then VA with minimum distance meeting device specification validation criteria may be chosen.

In an embodiment, a winner VA may need to be selected between VA2 and VA3 when a user is moving away from VA1, where VA2 has a bigger area range than VA3 for listening, but VA3 is closer than VA2. Accordingly, in view of distance, the winner may be VA3. However, if the ISM value is closer to 1, it may indicate that the user may speak significantly more and thus, VA2 may be selected as a winner, so that the user may stay in conversation with same VA for a longer time period. If ISM value is less than 0, then VA3 may be chosen as winner, since it has a lower range which will allow to complete the conversation, but due to lower range it may consume less power.

In another embodiment, a winner VA may need to be selected between VA2 and VA3 when a user is moving away from VA1 based on time taken to go through VA active range. Here, the time taken is directly proportional to active distance D[i]. In the current embodiment, the VA3 may be slightly closer in the direction of user's movement. Based on user's speed, the user's time to stay in VA3's active radius may be less than user's time to stay in VA2's active radius. Accordingly, the VA2 may be selected as the next VA for listening to user's remaining conversation, because the user may pass VA3 in very less time, and hence, turning on/off VA3 for such less amount of time may not be desired.

Figure 11:
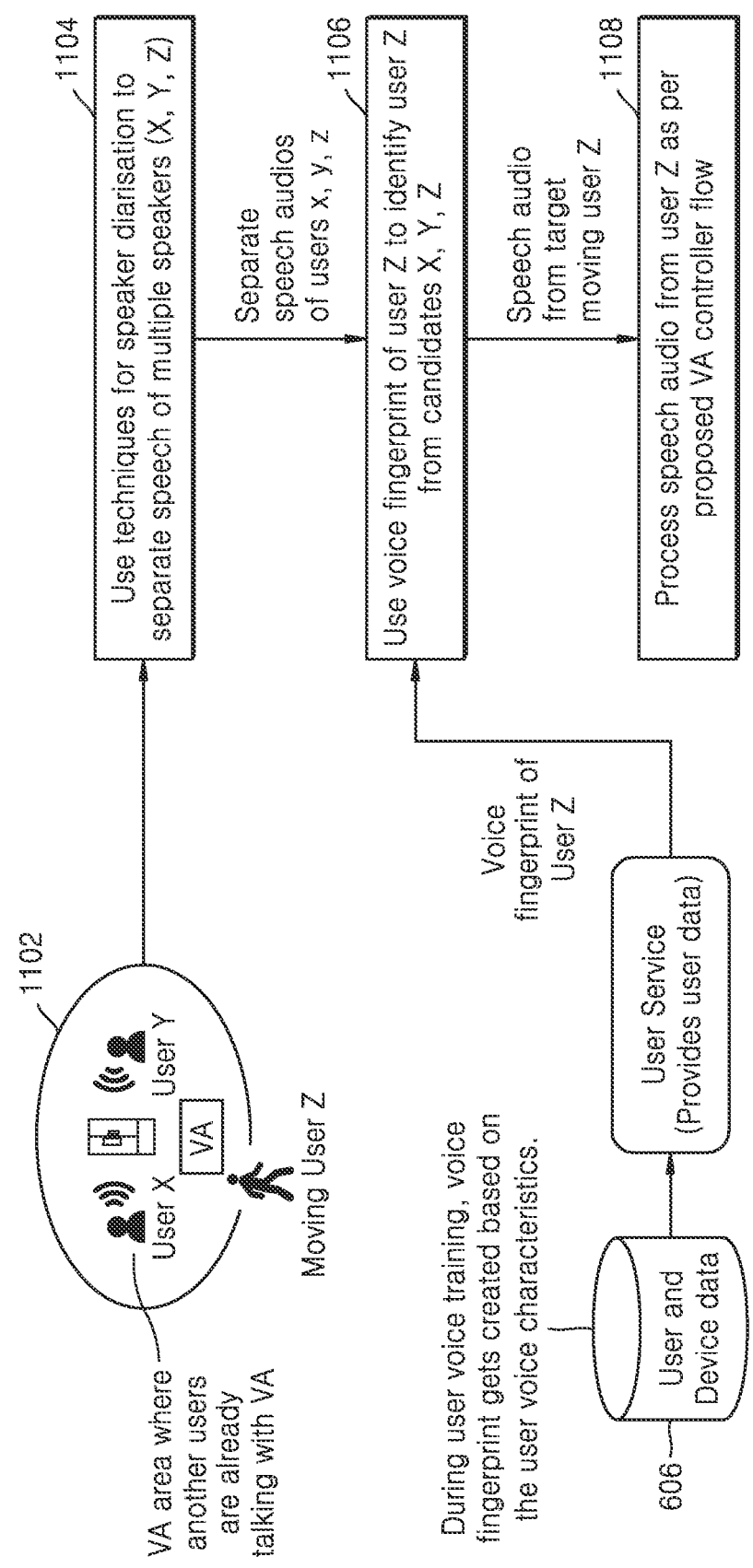
FIG. 11 illustrates a detailed process flow associated with speaker diarisation and voice fingerprinting to identify various users in the smart/IoT environment, according to an embodiment of the present disclosure.

FIG. 11 illustrates a detailed process flow 1100 associated with speaker diarisation and voice fingerprinting to identify various users in the smart/IoT environment, according to an embodiment of the present disclosure. As shown at 1102, a smart/IoT environment may include multiple users which may be already talking to a VA. For instance, there may be users X, Y, and Z around a VA, while the moving user Z needs to be heard for voice command. In order to identify the user whose voice command needs to be heard, a speaker diarisation technique at operation 1104 may be used to separate speeches of multiple users (e.g., X, Y, Z). The speaker diarisation facilitates separating the speeches of various users, such as users X, Y, and Z.

Additionally, at operation 1106, during user voice training at the VA, a voice fingerprint may be created for each user based on the user voice characteristics. Thus, the stored voice fingerprint may be utilized during operation of the VAs to identify a target user from the separated speech audios, as received after speaker diarisation. One the target user is identified, the speech audio from user Z may be processed at operation 1108 as per proposed VA controller flow.

In an embodiment, multiple VAs may be located within designated areas (e.g., a room and a living area) of an environment. Each designated area may have multiple users and multiple VAs. For example, the room may have two users (X and Y) while the living area may include a user Z. The user X may be on the move from the room area to the living area, while providing a voice input command. The living area VA may be selected for listening to user X's voice input command based on voice fingerprint of the user X and/or meaning of utterances which are received from multiple VAs in the environment. Further, while the living area VA may be listening to user inputs from user X and user Z, however, the living area VA may be able to differentiate voice inputs of users X and Z based on speaker diarisation of the living room VA.

Figure 12:
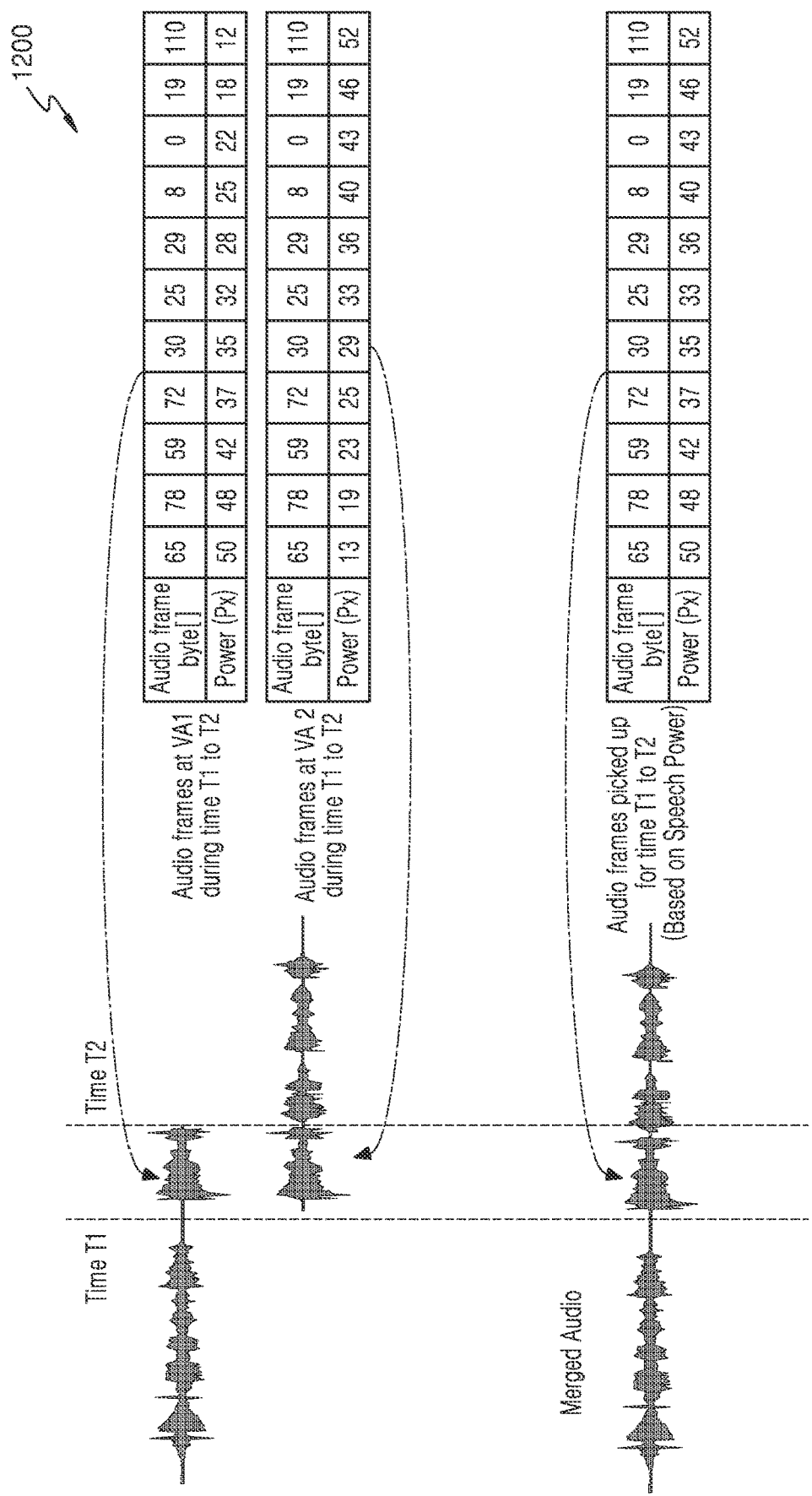
FIG. 12 illustrates a depiction of audio merger module without regeneration, according to an embodiment of the present disclosure.

FIG. 12 illustrates a depiction 1200 of the audio merger module without regeneration, according to an embodiment of the present disclosure. As shown, the audio frames at each of VA1 and VA2 from time T1 to T2 with the associated respective powers are captured. The audio merger module may be configured to pick up audio data with higher power selectively from the audio from VA1 and audio from VA2 for overlapped signal. In given example, first five values are picked from VA1 and rest of the values are picked from VA2, and as a result, entire audio is of high quality.

Figure 13:
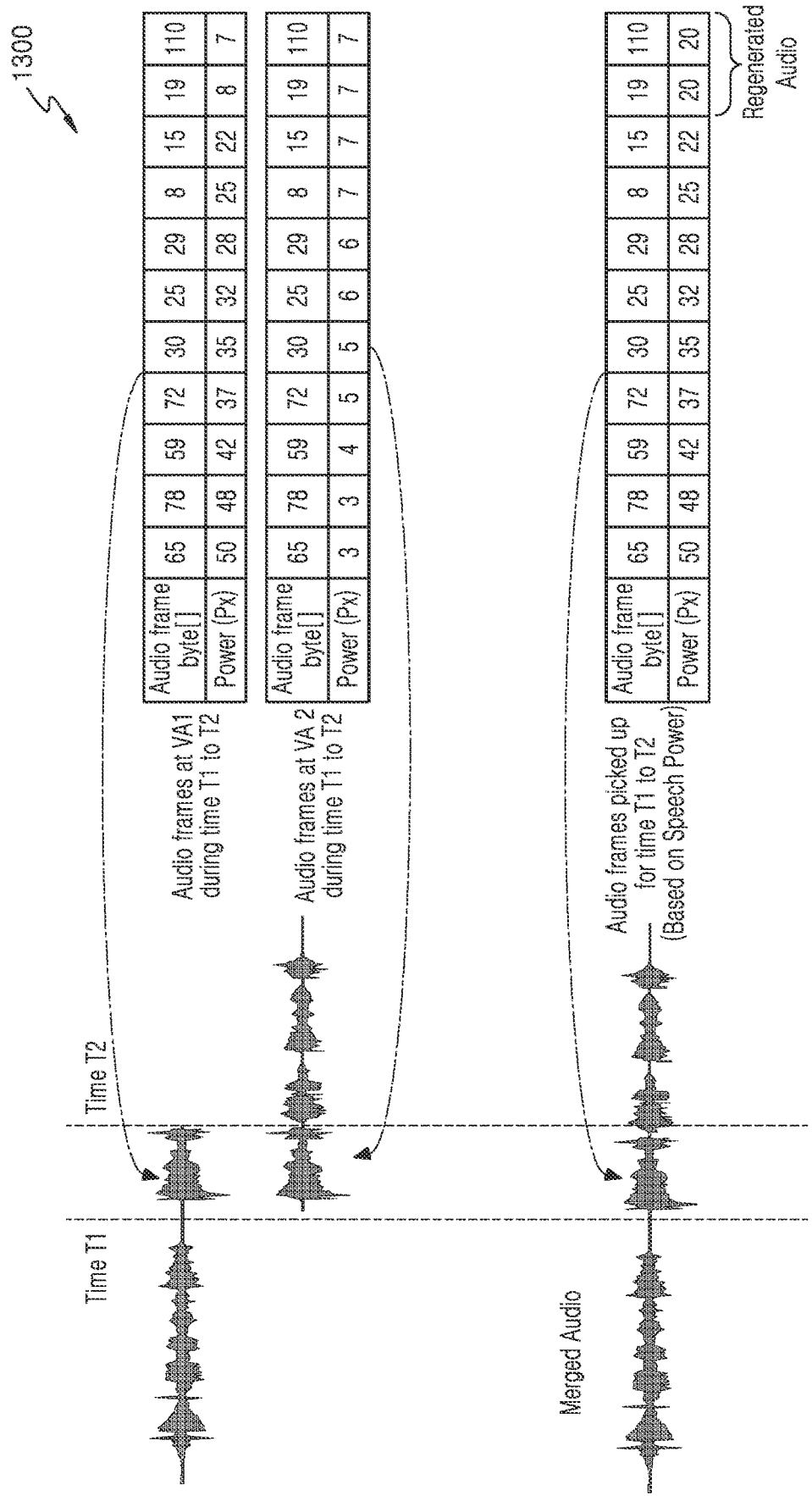
FIG. 13 illustrates a depiction of audio merger module with regeneration for distorted signal, according to an embodiment of the present disclosure.

FIG. 13 illustrates a depiction 1300 of audio merger module with regeneration for distorted signal, according to an embodiment of the present disclosure. As shown, the audio frames at each of VA1 and VA2 from time T1 to T2 with the associated respective powers are captured. As Speech Power is less than a predefined threshold (in this case, 10) for few audio frames, the signal will be distorted, corrupted or part of speech might be lost. In such a scenario, the audio merger module may utilize audio regeneration to generate missing, corrupted characters or phonemes, apart from merging the audio.

Figure 14:
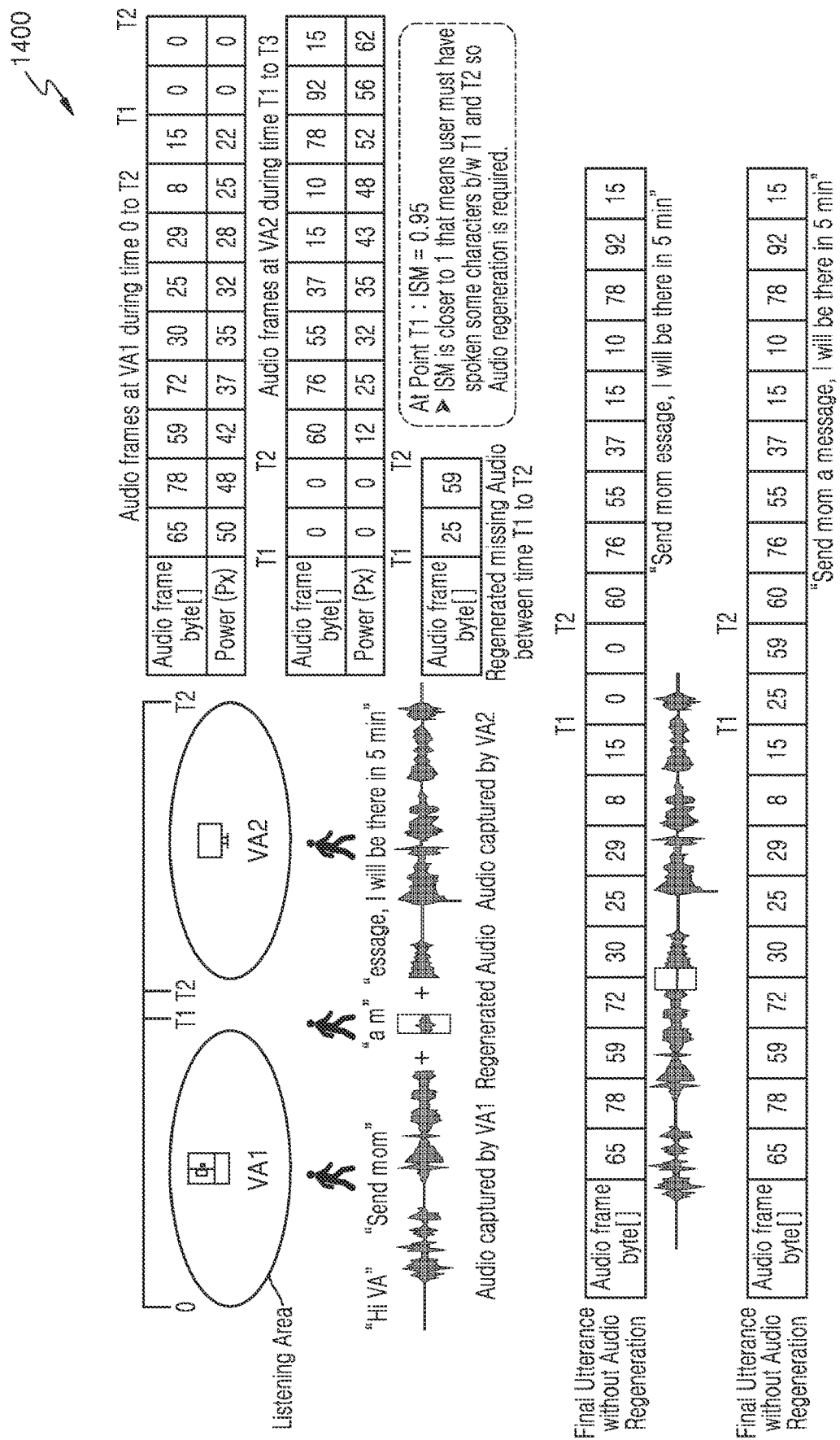
FIG. 14 illustrates a depiction of audio merger module with regeneration for lost signal, according to an embodiment of the present disclosure.

FIG. 14 illustrates a depiction 1400 of audio merger module with regeneration for lost signal, according to an embodiment of the present disclosure. As shown, the audio frames at during time 0 to T2 may be captured at VA1. Further, the audio frames at during time T1 to T3 may be captured at VA2. However, some audio frames from T1 to T2 may be missed by both the VAs. In such a scenario, the audio merger module may be configured to correlate the ISM value for one or more missing timestamps (e.g., T1 to T2).

In an scenario, since at timestamp T1, ISM=0.95. Since, the ISM is closer to 1, the merger/regenerator module may be configured to determine that the user must have spoken some characters between T1 and T2, and thus, audio regeneration is required.

Figure 15:
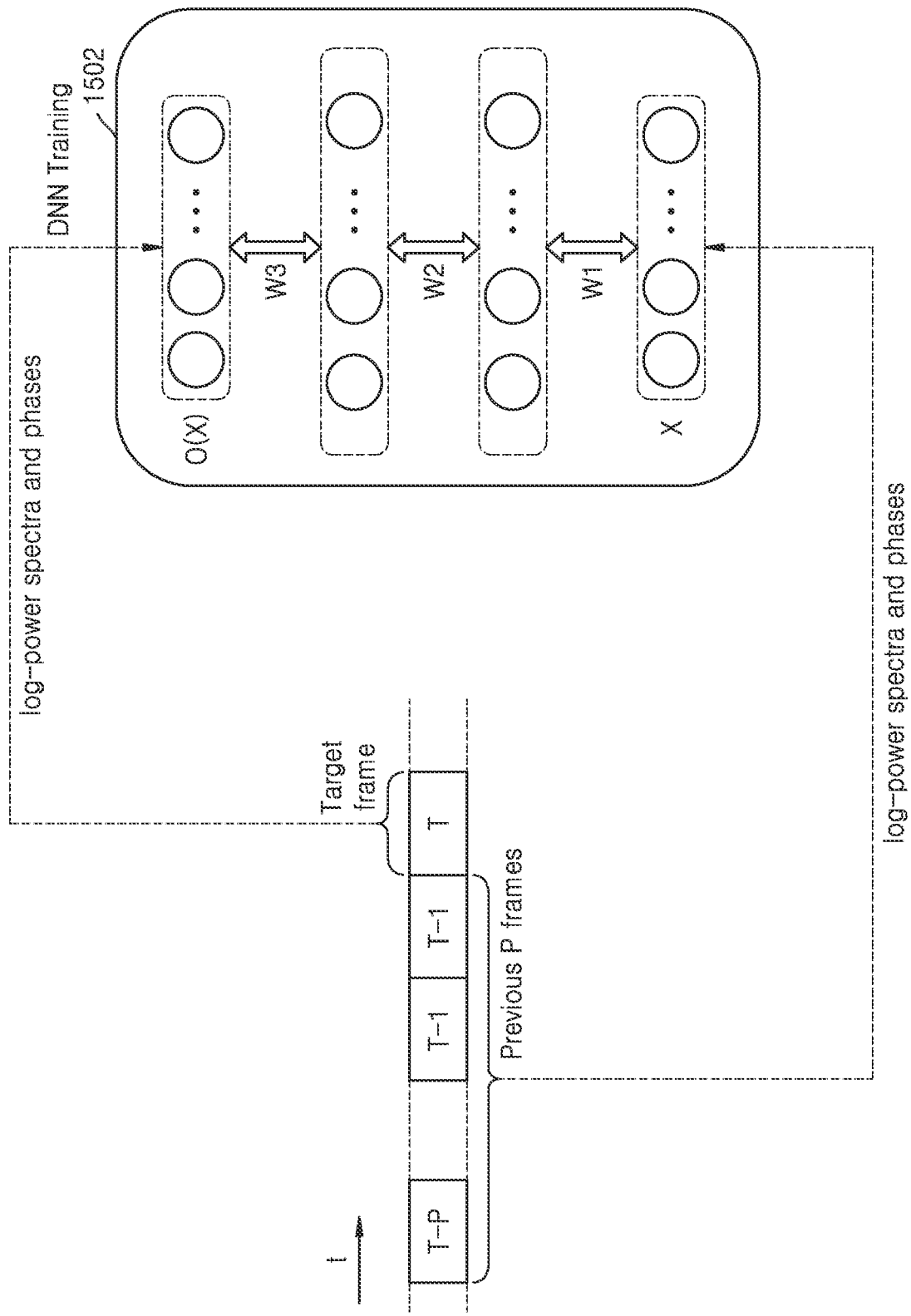
FIG. 15 illustrates an depiction of audio regeneration module, according to an embodiment of the present disclosure.

FIG. 15 illustrates a depiction 1500 of audio regeneration module 442, according to an embodiment of the present disclosure. In addition to extracting the log-power spectra and phases from the previous P frames prior to the target frame T and using them as input features for training, the DNN, the system computes the log-power spectra and phases of the target frame T to be used as the target features in the DNN training operation at 1502.

When a frame is missing in the test operation, the DNN captures the log-power spectra and phases information prior to the missing frame along the multiple frames and then leads to successful concealment on the target frame through the non-linear mapping functions.

For the DNN training, two DNNs are used, where the first one is based on the log-power spectra and the second one is established for the phases. Each DNN is a feed-forward neural network with many levels allowing it to map the previous speech frame features to current speech frame features. The DNN training stage has two operations: unsupervised pre-training part and supervised fine-tuning part.

Figure 16A:
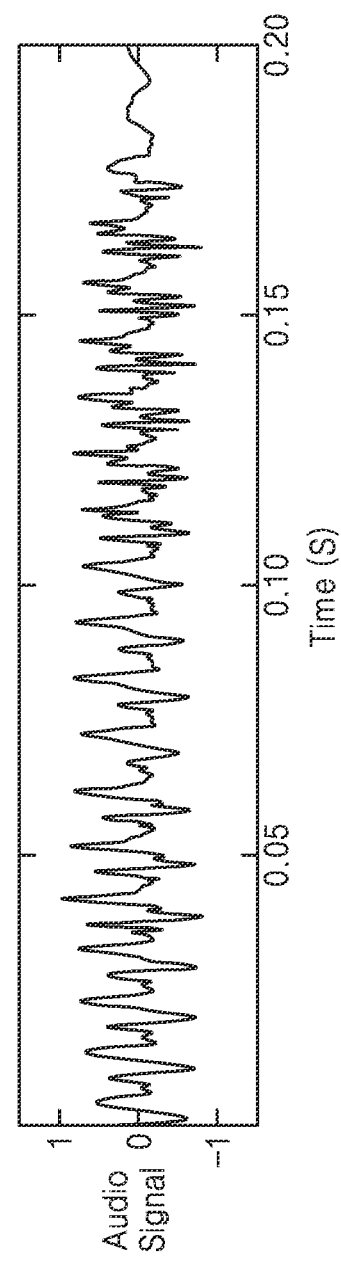
FIGS. 16A-16C illustrate depictions of speech waverforms with/without distortions and regenerated audio, according to an embodiment of the present disclosure.
Figure 16B:
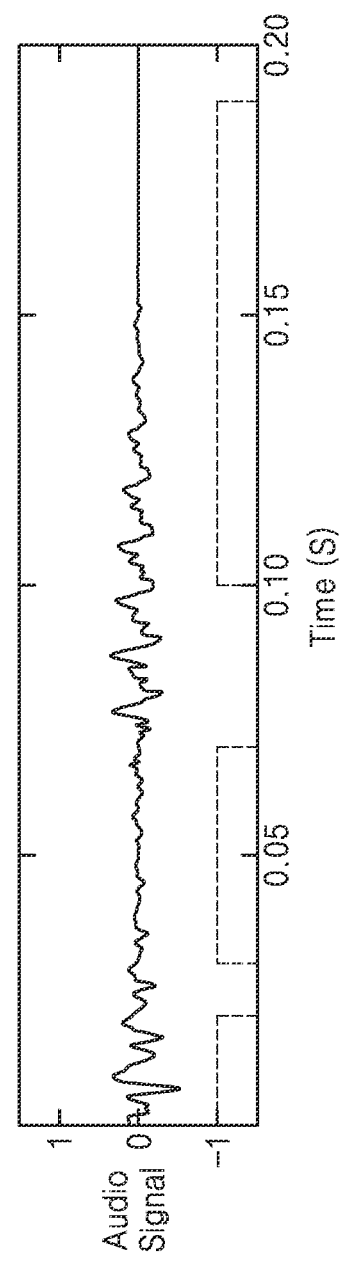
Figure 16C:
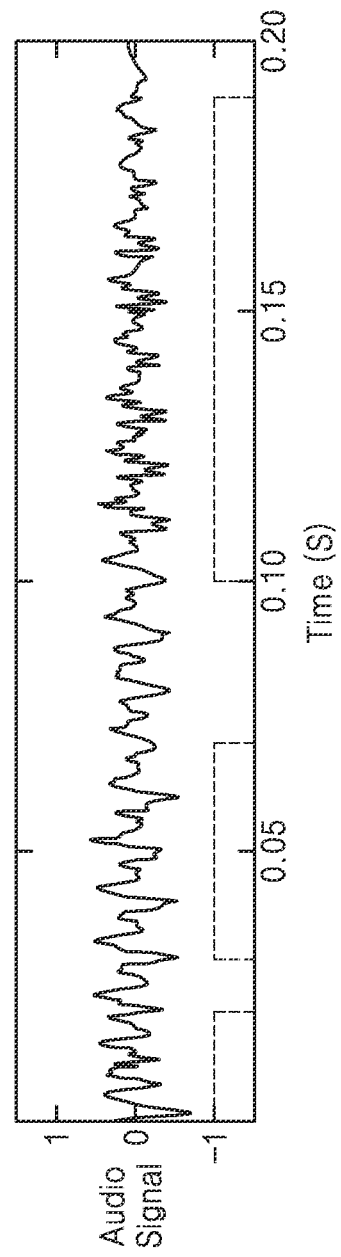

FIGS. 16A-16C illustrate depictions of speech waveforms with/without distortions and regenerated audio, according to an embodiment of the present disclosure. Specifically, FIG. 16A depicts a speech waveform without any distortion. FIG. 16B depicts a speech waveform with distortions and signal losses which are indicated by dotted boxes. FIG. 16C depicts a speech waveform where distorted and lost signals are regenerated using audio regenerator.

Figure 17:
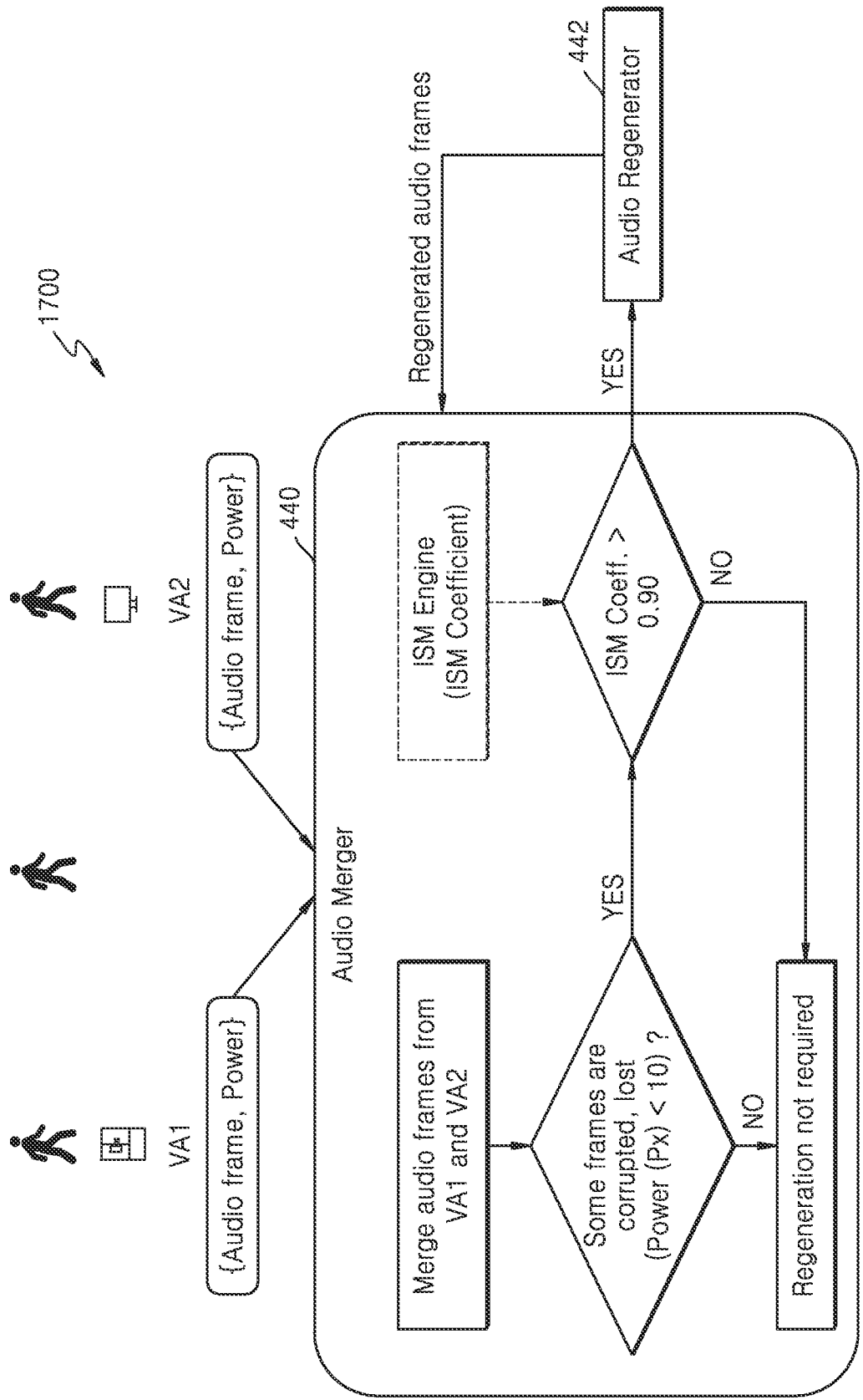
FIG. 17 illustrates a depiction of audio merger module and audio regeneration module interaction, according to an embodiment of the present disclosure.

FIG. 17 illustrates a depiction 1700 of audio merger module 440 and audio regeneration module 442 interaction, according to an embodiment of the present disclosure. In an embodiment, the audio merger module 440 may be configured to merge audio from different VAs (in this case, from VA1 and VA2). The audio merger module 440 may detect overlapped signals and intelligently picks part of audio from them. Further, audio merger module may also detect corrupted and lost signal and regenerates them using Audio Regenerator 442. As signal loss can be due to "No Speech" by user, ISM value is taken into consideration to determine whether some characters need to be regenerated. An ISM coefficient>0.90 signifies Speech Exhalation, and in turn, informs the system that regeneration is required.

Figure 18A:
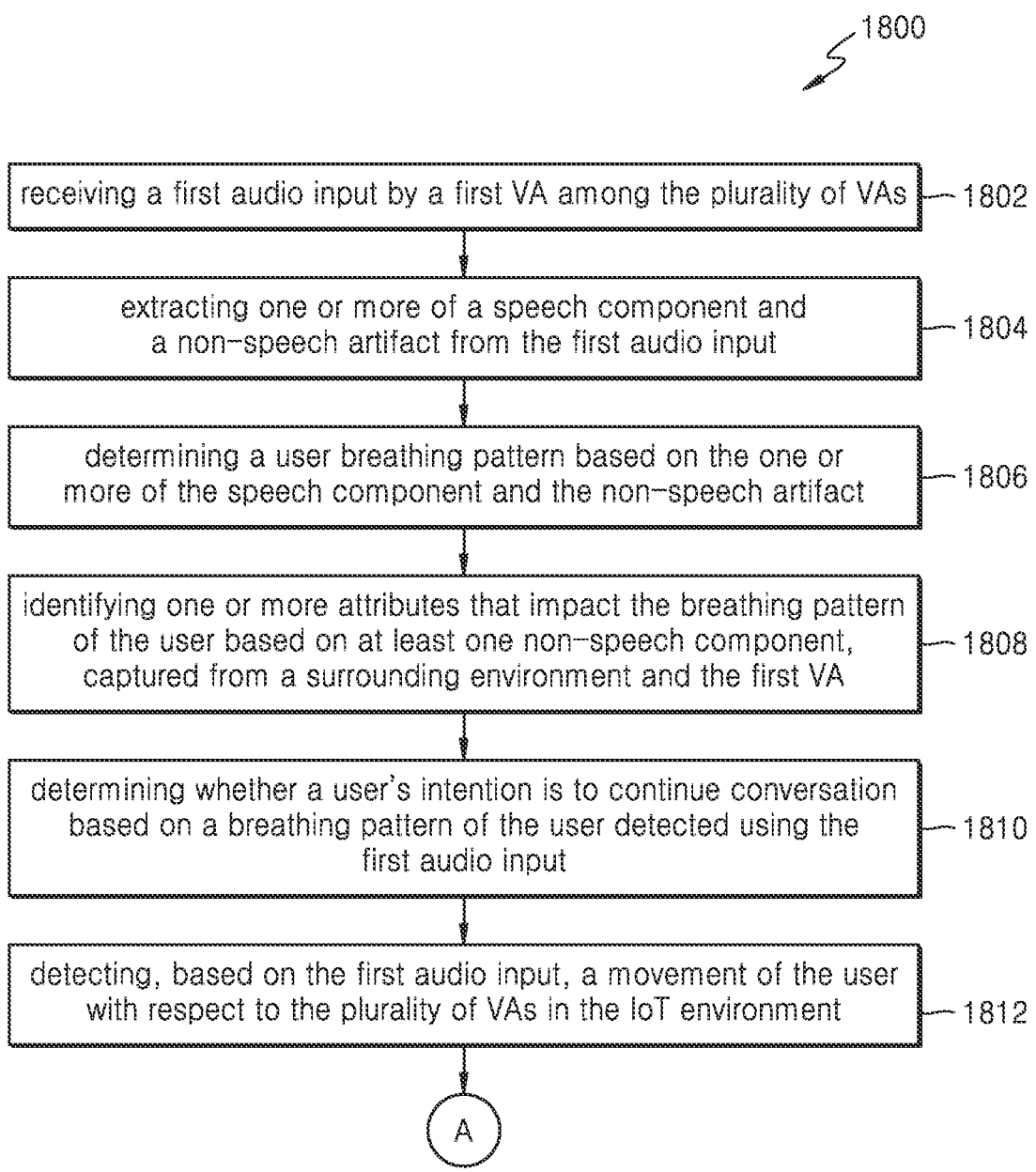
FIGS. 18A and 18B illustrate a process flow for receiving a voice command via multiple voice assistant devices, according to one embodiment of the present disclosure.
Figure 18B:
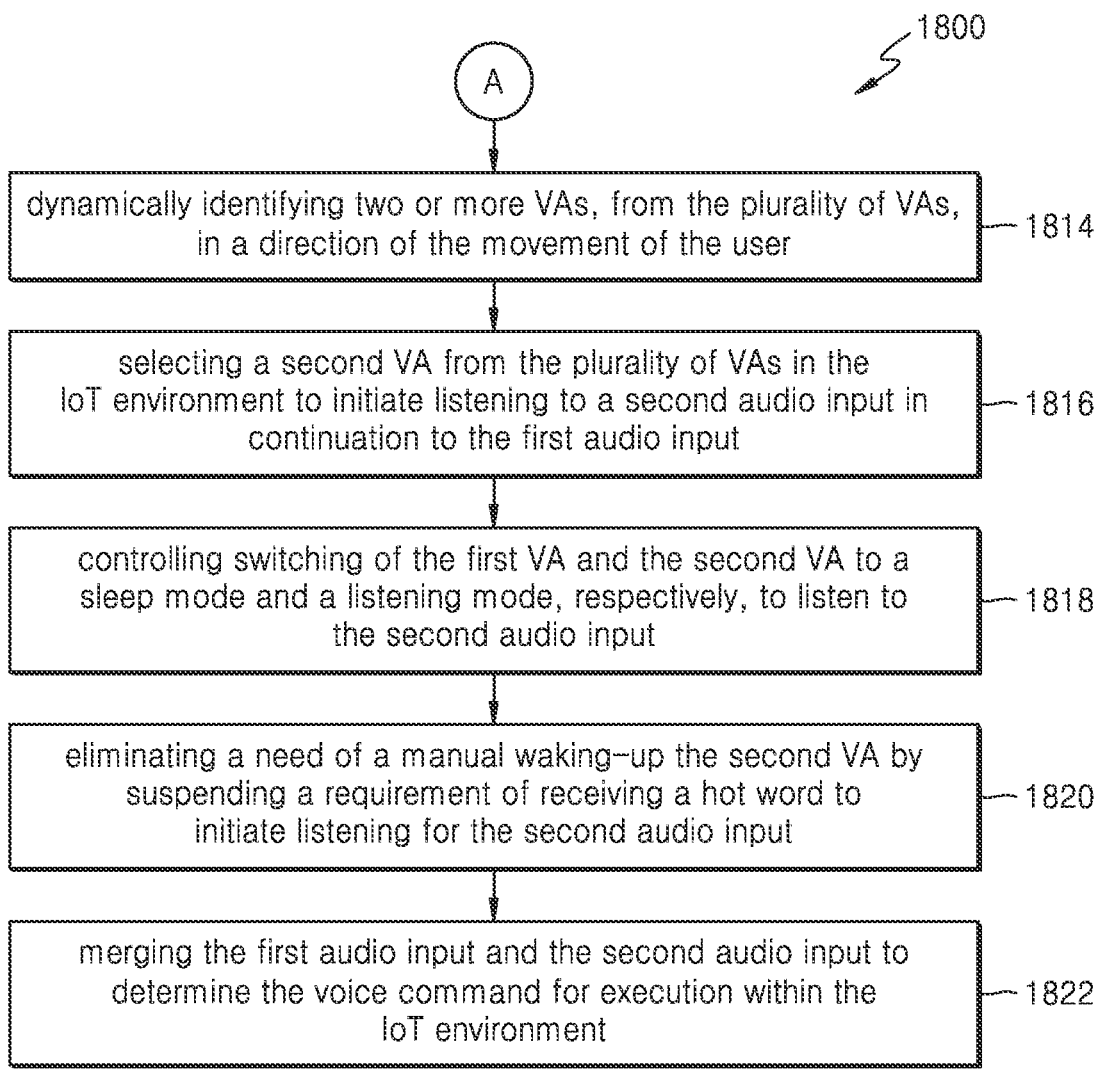
Figure 19A:
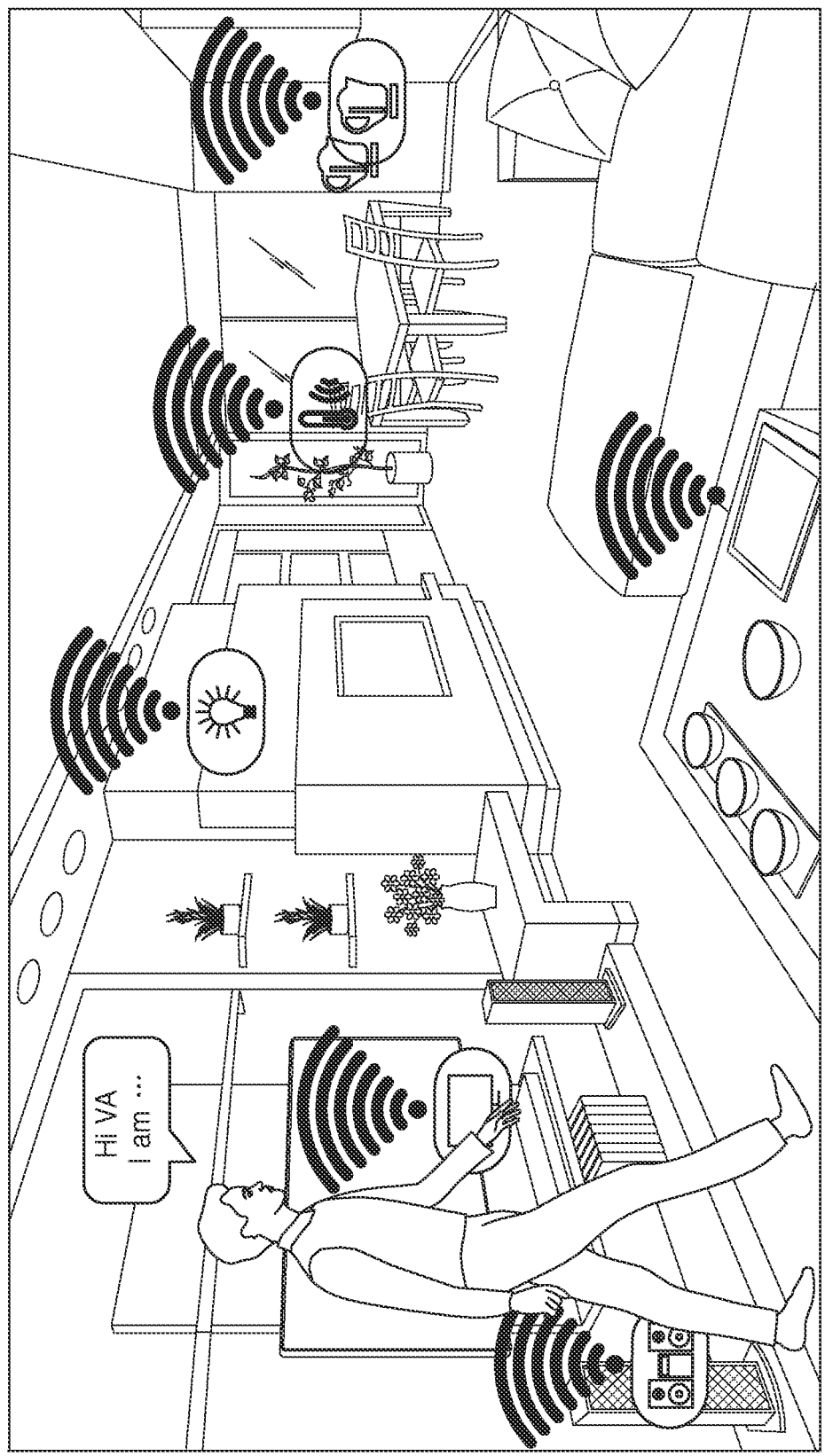
FIGS. 19A-19D illustrate a use case for listening to a user command using multiple controlled VAs, according to various embodiments of the present disclosure.
Figure 19B:
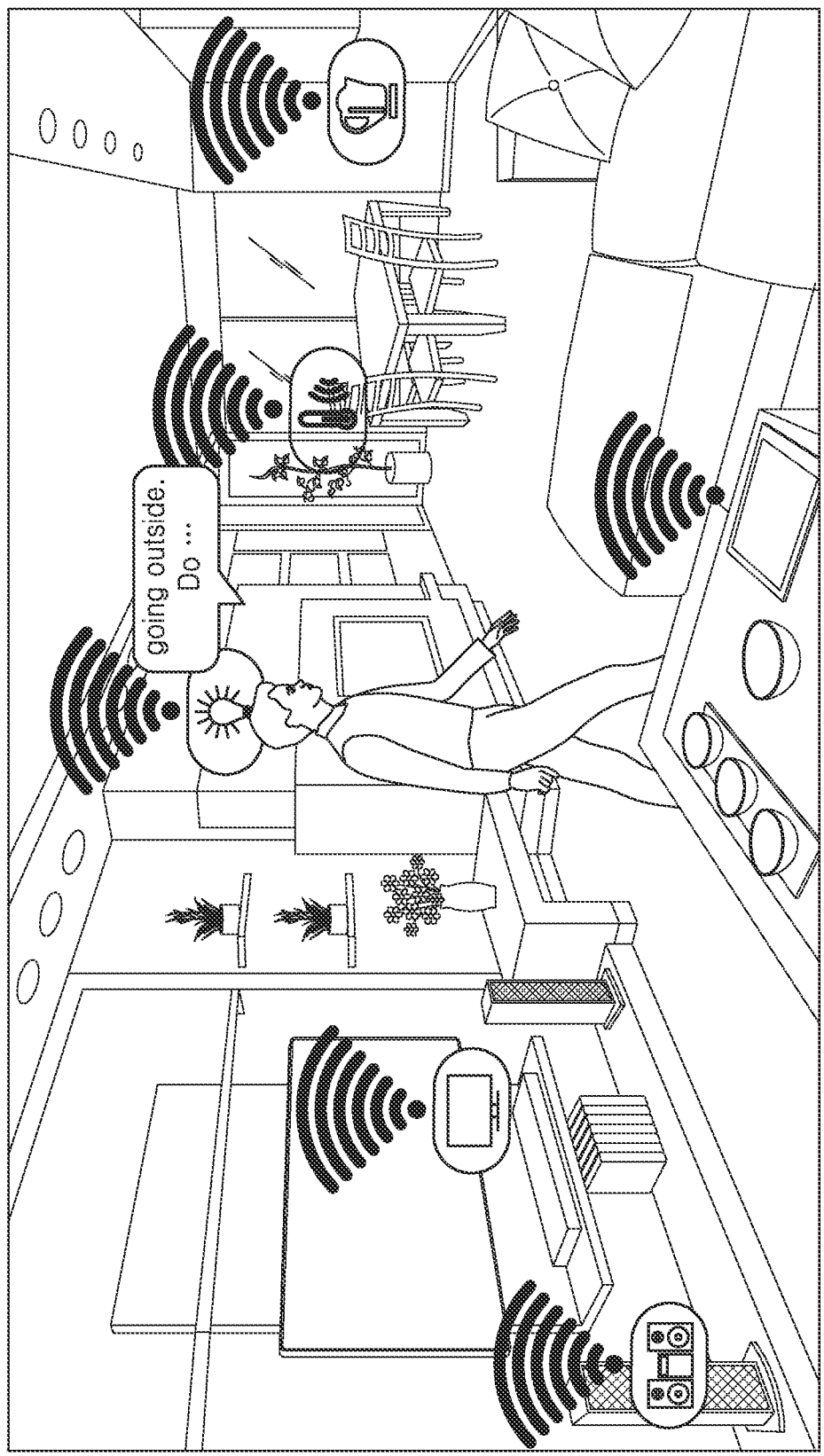
Figure 19C:
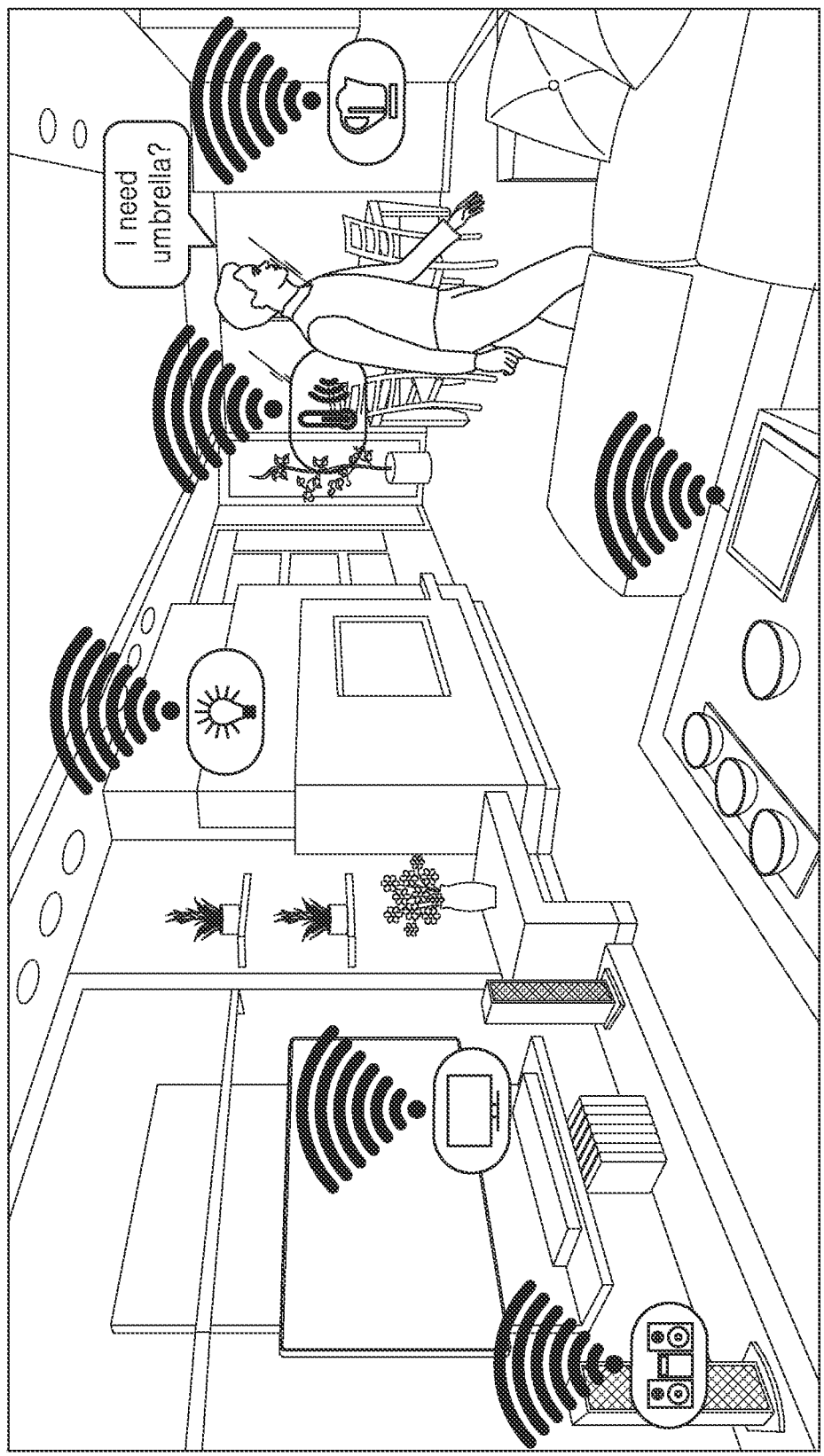
Figure 19D:
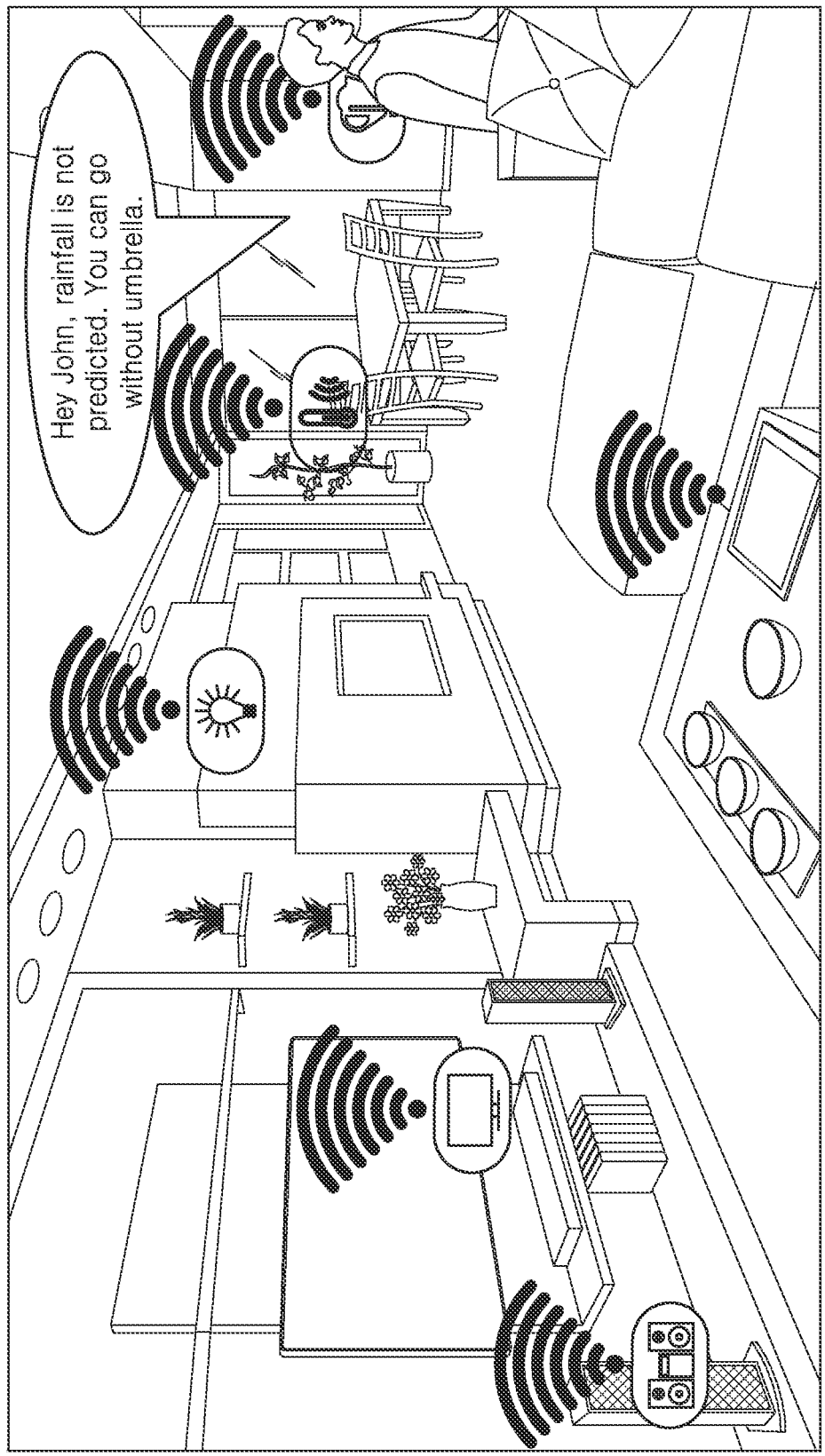

FIGS. 18A and 18B illustrate a process flow of a method 1800 for receiving a voice command via controlled multiple voice assistant devices, according to an embodiment of the present disclosure. In an embodiment, the operations of the method 1800 may be performed by the system 402, which may be integrated within the voice assistant device 404 or provided separately.

At operation 1802, the method 1800 includes receiving a first audio input by a first VA among the plurality of VAs within a smart/IoT environment. In an embodiment, the audio input may include a hot word indicating initiation of a conversation.

At operation 1804, the method 1800 includes extracting one or more of a speech components and a non-speech artifact from the first audio input. In an embodiment, the speech component comprises one or more of phonemes and graphemes. The non-speech artifact comprises one or more of breathing sounds and non-lexical speaker noise (e.g., hum, hmm, aaa, bb, etc.).

At operation 1806, the method 1800 includes determining a user breathing pattern based on the one or more of the speech components and the non-speech artifact. In an embodiment, the user breathing pattern is determined using one of an audio spectrogram and a waveform analysis. Further, the user breathing pattern may be determined based on the at least one speech component and the at least one non-speech artifact using a neural network model. In an embodiment, the user breathing pattern identification may include identifying a duration and an amplitude of at least one inhalation and exhalation of the user while providing the audio input to the voice assistant device.

At operation 1808, the method 1800 includes identifying one or more attributes that impact the breathing pattern of the user based on at least one non-speech component, captured from a surrounding environment and the first VA. In an embodiment, the at least one non-speech component comprises one or more of environment noise, microphone channel noise, and non-speech artifacts (e.g., non-lexical speaker noise such as hum, hmm, aaa, bb, etc. along with breathing sounds). Further, the one or more attributes comprise one or more of environmental parameters, user data, and voice assistant device data.

At operation 1810, the method 1800 includes determining whether a user's intention is to continue the conversation based on an analysis of the user breathing pattern, the one or more attributes, and using the first audio input. In an embodiment, the determining may be performed after detecting a pause in the audio input. In an embodiment, the determining comprises determining an intention-to-speak more (ISM) coefficient based on the analysis of the user breathing pattern and the one or more attributes. In an embodiment, the determination of whether the user's intention is to continue conversation is based on the identified duration and the amplitude of the at least one inhalation and exhalation of the user while providing the input to the voice assistant device. In another embodiment, the determining of whether a user's intention is to continue the conversation comprises determining an Intention-to-Speak More (ISM) value based on the speech component, the non-speech artifact, and the one or more attributes. Accordingly, in an embodiment, the operation 1810 may include operations 1804-1808.

At operation 1812, the method 1800 includes detecting, based on the first audio input, a movement of the user with respect to the plurality of VAs in the IoT environment. In an embodiment of the present disclosure, detecting the movement of the user comprises determining, based on the first audio input and a pre-trained neural network, at least one of a walking angle, distance, and speed of the user with respect to the first VA.

At operation 1814, the method 1800 includes dynamically identifying two or more VAs, from the plurality of VAs, in a direction of the movement of the user.

At operation 1816, the method 1800 includes selecting a second VA from the plurality of VAs in the IoT environment to initiate listening to a second audio input in continuation to the first audio input. The selecting of the second VA may be based on one or more of the user's intention to continue the conversation, a signal strength of the first audio input, a voice fingerprint of the user, and the detected movement of the user. In another embodiment of the present disclosure, the selecting the second VA from the two or more identified VAs may be based on a speech frequency of the user and at least one device characteristic of each of the two or more VAs.

In an embodiment of the present disclosure, the selecting the second VA comprises identifying the second VA in a direction of the movement of the user in response to detecting that the signal strength of the first audio input received by the first VA is dropping below a predefined signal threshold and in response to detecting that the ISM value is greater than a predefined ISM coefficient threshold.

At operation 1818, the method 1800 includes controlling switching the first VA and the second VA to a sleep mode and a listening mode, respectively, to listen to the second audio input.

At operation 1820, the method 1800 includes eliminating a need of a manual waking-up the second VA by suspending a requirement of receiving a hot word to initiate listening for the second audio input.

At operation 1822, the method 1800 includes merging the first audio input and the second audio input to determine the voice command for execution within the IoT environment. In an embodiment of the present disclosure, merging the first audio input and the second audio input comprises removing one or more overlapping parts in the first audio input and the second audio input received at the first VA and the second VA, respectively. Further, the merging may include regenerating at least a speech frame of one of the first audio input and the second audio input, in response to determining that signal strength for the speech frame associated with at least one of the first audio input and the second audio input is less than a predefined threshold, thereby indicating one of a distorted, corrupted, and missing audio. Further, in an embodiment, prior to regenerating, the method 1800 may include determining a need for regeneration of at least one audio frame of the first audio input and/or the second audio input based on the ISM value and a timestamp of the first audio input and the second audio input.

While the above discussed operations in FIG. 18 are shown and described in a particular sequence, the operations may occur in variations to the sequence in accordance with various embodiments.

FIGS. 19A-19D illustrate a use case for listening to a user command using multiple VAs, according to various embodiments of the present disclosure. As shown, a user "John" is ready to go outside and want to check with the VA about the need of umbrella. With an intelligent collaboration between available VAs, John is able to give the voice command while walking along with preparing to go outside, without pausing himself to dedicatedly interact with single VA. Privacy for John is preserved in following ways:

1. Most of the time a single VA is active to listen voice command.
2. VA's response is coming only on last VA which is closest to John.
3. Follow up question is only get asked by closest VA to John.

Figure 20:
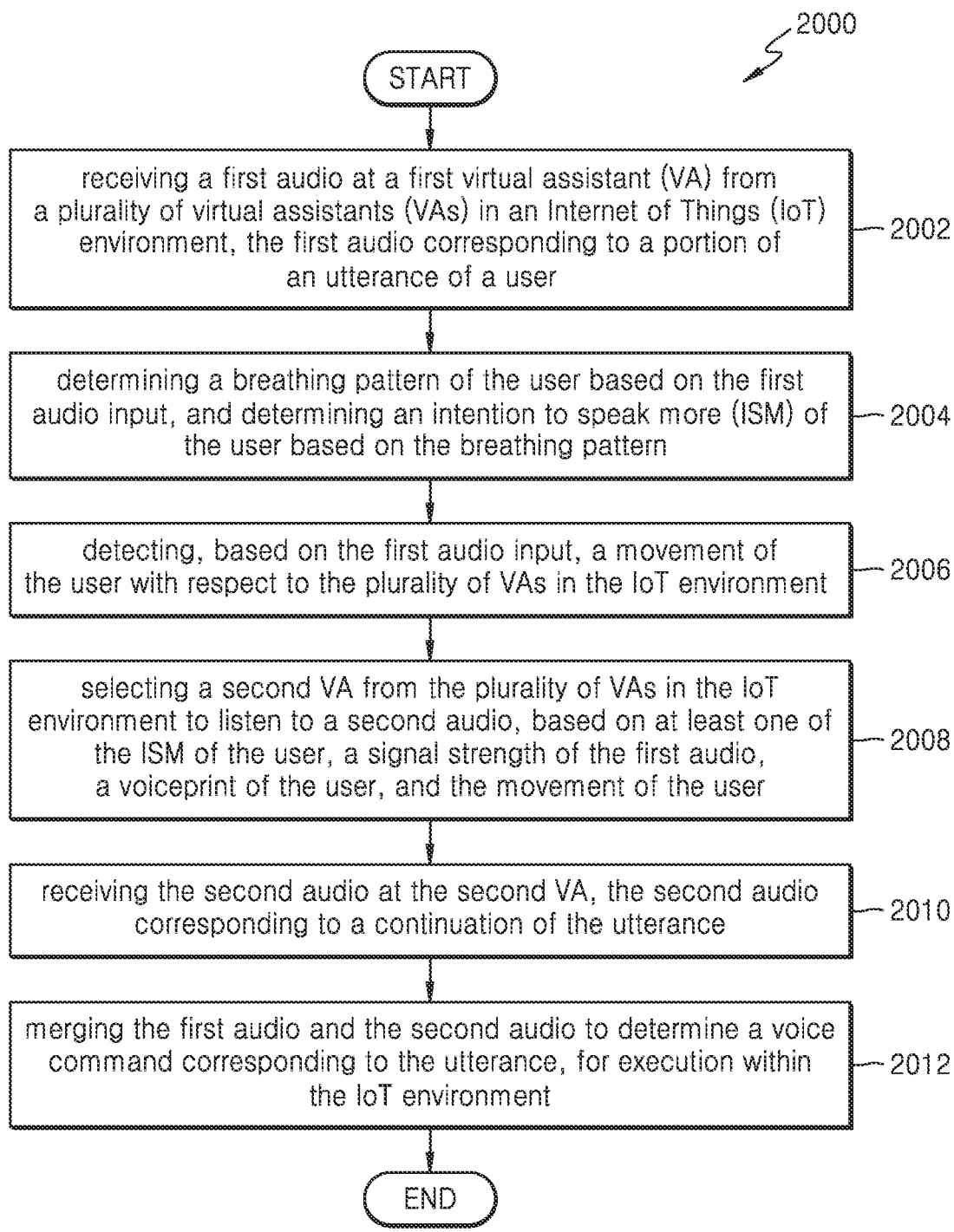
FIG. 20 illustrates a process flow of a method 2000 for receiving a voice command via controlled multiple voice assistant devices, according to an embodiment of the present disclosure.

FIG. 20 illustrates a process flow of a method 2000 for receiving a voice command via controlled multiple voice assistant devices, according to an embodiment of the present disclosure.

At operation 2002, the method 2000 may include receiving a first audio from a first virtual assistant (VA) from a plurality of virtual assistants (VAs) in an Internet of Things (IoT) environment, the first audio corresponding to a portion of a user's utterance. In an embodiment, the audio input may include a hot word indicating initiation of a conversation. In an embodiment, the operations of the method 2000 may be performed by the system 402, which may be integrated within the voice assistant device 404 or provided separately.

At operation 2004, the method 2000 may include determining a breathing pattern of the user based on the first audio input, and determining an intention to speak more (ISM) of the user based on the breathing pattern. In an embodiment, the user breathing pattern is determined using one of an audio spectrogram and a waveform analysis. Further, the user breathing pattern may be determined based on the at least one speech component and the at least one non-speech artifact using a neural network model. In an embodiment, the user breathing pattern identification may include identifying a duration and an amplitude of at least one inhalation and exhalation of the user while providing the audio input to the voice assistant device.

At operation 2006, the method 2000 may include detecting, based on the first audio input, a movement of the user with respect to the plurality of VAs in the IoT environment. In an embodiment of the present disclosure, detecting the movement of the user comprises determining, based on the first audio input and a pre-trained neural network, at least one of a walking angle, distance, and speed of the user with respect to the first VA.

At operation 2008, the method 2000 may include selecting a second VA from the plurality of VAs in the IoT environment to listen to a second audio, based on at least one of the ISM of the user, a signal strength of the first audio, a voiceprint of the user, and the movement of the user. In an embodiment of the present disclosure, the selecting the second VA comprises identifying the second VA in a direction of the movement of the user in response to detecting that the signal strength of the first audio input received by the first VA is dropping below a predefined signal threshold and in response to detecting that the ISM value is greater than a predefined ISM coefficient threshold.

At operation 2010, the method 2000 may include receiving the second audio from the second VA, the second audio corresponding to a continuation of the user's utterance.

At operation 2012, the method 2000 may include and merging the first audio and the second audio to determine a voice command corresponding to the user's utterance, for execution within the IoT environment. In an embodiment of the present disclosure, merging the first audio input and the second audio input comprises removing one or more overlapping parts in the first audio input and the second audio input received at the first VA and the second VA, respectively. Further, the merging may include regenerating at least a speech frame of one of the first audio input and the second audio input, in response to determining that signal strength for the speech frame associated with at least one of the first audio input and the second audio input is less than a predefined threshold, thereby indicating one of a distorted, corrupted, and missing audio.

According to an aspect of the disclosure, a method of receiving a voice command, includes: receiving a first audio from a first virtual assistant (VA) from a plurality of virtual assistants (VAs) in an Internet of Things (IoT) environment, the first audio corresponding to a portion of a user's utterance; determining a breathing pattern of the user based on the first audio input, and determining an intention to speak more (ISM) of the user based on the breathing pattern; detecting, based on the first audio input, a movement of the user with respect to the plurality of VAs in the IoT environment; selecting a second VA from the plurality of VAs in the IoT environment to listen to a second audio, based on at least one of the ISM of the user, a signal strength of the first audio, a voiceprint of the user, and the movement of the user; receiving the second audio from the second VA, the second audio corresponding to a continuation of the user's utterance; and merging the first audio and the second audio to determine a voice command corresponding to the user's utterance, for execution within the IoT environment. The merging the first audio and the second audio may include: removing at least one duplicated portion of the user's utterance from the first audio received at the first VA and the second audio received at the second VA; and regenerating at least one audio frame of at least one of the first audio and the second audio, based on determining that a signal strength for the at least one speech frame is less than a predefined threshold. The merging the first audio and the second audio may include: merging at least one audio frame of the first audio and the second audio based on a timestamp of the at least one audio frame to determine the voice command. The detecting the movement of the user with respect to the plurality of VAs in the IoT environment may include: determining, based on the first audio and a pre-trained neural network, at least one of a walking angle, a walking distance, and a walking speed of the user with respect to the first VA. The selecting the second VA may include: switching the first VA from a listening mode to a sleep mode; and switching the second VA from the sleep mode to the listening mode, to listen to the second audio.

The determining the ISM of the user may include: extracting at least one non-speech artifact from the first audio, the non-speech artifact comprising at least one of breathing sounds and non-lexical speaker noise; and identifying at least one attribute that impacts the breathing pattern of the user based on the at least one non-speech artifact.

The determining the ISM of the user may include: extracting at least one speech component from the first audio, the speech component comprising at least one of phonemes and graphemes; and determining an ISM value based on the a least one speech component, the a least one non-speech artifact, and the a least one attribute.

The determining the ISM of the user may include: determining, based on the ISM value, a timestamp of the first audio, and a timestamp of the second audio, whether to regenerate at least one audio frame of at least one of the first audio and the second audio.

The selecting the second VA from the plurality of VAs in the IoT environment to listen to a second audio may include: identifying the second VA in a direction of the movement of the user, based on detecting that a signal strength of the first audio from the first VA is dropping below a predefined signal threshold and the ISM value is greater than a predefined ISM coefficient threshold.

The receiving the second audio from the second VA, may include: receiving the second audio from the second VA in an absence of the second VA detecting a hot word to initiate listening for the second audio.

The selecting the second VA from the plurality of VAs in the IoT environment to listen to the second audio may include: identifying at least two VAs, from the plurality of VAs, in a direction of the movement of the user; and selecting the second VA from the at least two VAs based on a speech frequency of the user and at least one device characteristic of the two or more VAs.

According to an aspect of the disclosure, a system for receiving a voice command, includes: a memory storing at least one instruction; and at least one processor configured to execute the at least one instruction to: receive a first audio from a first virtual assistant (VA) from a plurality of virtual assistants (VAs) in an Internet of Things (IoT) environment, the first audio corresponding to a portion of a user's utterance; determine a breathing pattern of the user based on the first audio input, and determining an intention to speak more (ISM) of the user based on the breathing pattern; detect, based on the first audio input, a movement of the user with respect to the plurality of VAs in the IoT environment; select a second VA from the plurality of VAs in the IoT environment to listen to a second audio, based on at least one of the ISM of the user, a signal strength of the first audio, a voiceprint of the user, and the movement of the user; receive the second audio from the second VA, the second audio corresponding to a continuation of the user's utterance; and merge the first audio and the second audio to determine a voice command corresponding to the user's utterance, for execution within the IoT environment.

The at least one processor may be further configured to execute the at least one instruction to: remove at least one duplicated portion of the user's utterance from the first audio received at the first VA and the second audio received at the second VA; and regenerate at least one audio frame of at least one of the first audio and the second audio, based on determining that a signal strength for the at least one speech frame is less than a predefined threshold.

The at least one processor may be further configured to execute the at least one instruction to: extract at least one non-speech artifact from the first audio, the non-speech artifact comprising at least one of breathing sounds and non-lexical speaker noise; and identify at least one attribute that impacts the breathing pattern of the user based on the at least one non-speech artifact.

The at least one processor may be further configured to execute the at least one instruction to: extract at least one speech component from the first audio, the speech component comprising at least one of phonemes and graphemes; and determine an ISM value based on the a least one speech component, the a least one non-speech artifact, and the a least one attribute.

The at least one processor may be further configured to execute the at least one instruction to: identify the second VA in a direction of the movement of the user, based on detecting that a signal strength of the first audio from the first VA is dropping below a predefined signal threshold and the ISM value is greater than a predefined ISM coefficient threshold.

The at least one processor may be further configured to execute the at least one instruction to: receive the second audio from the second VA in an absence of the second VA detecting a hot word to initiate listening for the second audio.

The at least one processor may be further configured to execute the at least one instruction to: identify at least two VAs, from the plurality of VAs, in a direction of the movement of the user; and select the second VA from the at least two VAs based on a speech frequency of the user, and at least one device characteristic of the at least two VAs.

The at least one processor may be further configured to execute the at least one instruction to: detect the movement of the user with respect to the plurality of VAs in the IoT environment based on a pre-trained neural network configured to receive the first audio received at the first VA as an input, and output at least one of a walking angle, a walking distance, and a walking speed of the user with respect to the first VA.

According to an aspect of the disclosure, a computer readable medium stores computer readable program code or instructions which are executable by a processor to perform a method of receiving a voice command. The method includes: receiving a first audio from a first virtual assistant (VA) from a plurality of virtual assistants (VAs) in an Internet of Things (IoT) environment, the first audio corresponding to a portion of a user's utterance; determining a breathing pattern of the user based on the first audio input, and determining an intention to speak more (ISM) of the user based on the breathing pattern; detecting, based on the first audio input, a movement of the user with respect to the plurality of VAs in the IoT environment; selecting a second VA from the plurality of VAs in the IoT environment to listen to a second audio, based on at least one of the ISM of the user, a signal strength of the first audio, a voiceprint of the user, and the movement of the user; receiving the second audio from the second VA, the second audio corresponding to a continuation of the user's utterance; and merging the first audio and the second audio to determine a voice command corresponding to the user's utterance, for execution within the IoT environment.

The present disclosure provides for various technical advancements based on the key features discussed above. The listening time of one or more voice assistant devices in a smart/IoT environment may be automatically adjusted, leading to elimination of any wake-up command or trigger or hot word requirement for waking up the device again and again. This leads to smooth conversation of users with voice assistant devices even when the user is on the move in the environment. Further, the user can freely move within the environment and need not stay at one location to complete a voice command for a specific VA. Furthermore, in addition to various use cases discussed above related to pauses, the present disclosure may also be useful for different age groups. For example, usually kids have short vocal cords, they produce short air waves, shorter breaths, and have multiple longer pauses while speaking. Age impacts pauses. The disclosure takes this into consideration during breathing pattern analysis and accordingly adjusts the listening time during pause.

While example embodiments of the disclosure have been shown and described, the disclosure is not limited to the aforementioned specific embodiments and the specific language used to describe the embodiments. Any limitations arising on account thereto, are not intended. As would be apparent to a person having ordinary skill in the technical field to which the disclosure belongs, various modifications may be made without departing from the gist of the disclosure as claimed by the appended claims and their equivalents. It is intended that such modifications are not to be interpreted independently from the technical idea or prospect of the disclosure. Also, those skilled in the art will appreciate that one or more of the described elements may well be combined into a single functional element. Alternatively, certain elements may be split into multiple functional elements, and/or elements from one embodiment may be added to another embodiment.

What is claimed is:

1. A method of receiving a voice command, the method comprising:
    receiving a first audio from a first virtual assistant (VA) from a plurality of virtual assistants (VAs) in an Internet of Things (IoT) environment, the first audio corresponding to a portion of an utterance of a user;
    determining a breathing pattern of the user based on the first audio, and determining an intention to speak more (ISM) of the user based on the breathing pattern;
    detecting, based on the first audio, a movement of the user with respect to the plurality of VAs in the IoT environment;
    selecting a second VA from the plurality of VAs in the IoT environment to listen to a second audio, based on at least one of the ISM of the user, a signal strength of the first audio, a voiceprint of the user, and the movement of the user;
    receiving the second audio from the second VA, the second audio corresponding to a continuation of the utterance; and
    merging the first audio and the second audio to determine a voice command corresponding to the utterance, for execution within the IoT environment.

2. The method of claim 1, wherein the merging the first audio and the second audio comprises:
    removing at least one duplicated portion of the utterance from the first audio received at the first VA and the second audio received at the second VA; and
    regenerating at least one audio frame of at least one of the first audio and the second audio, based on determining that a signal strength for the at least one audio frame is less than a predefined threshold.

3. The method of claim 1, wherein the merging the first audio and the second audio comprises:

merging at least one audio frame of the first audio and the second audio based on a timestamp of the at least one audio frame to determine the voice command.

4. The method of claim 1, wherein the detecting the movement of the user with respect to the plurality of VAs in the IoT environment comprises:
determining, based on the first audio and a pre-trained neural network, at least one of a walking angle, a walking distance, and a walking speed of the user with respect to the first VA.

5. The method of claim 1, wherein the selecting the second VA comprises:
switching the first VA from a listening mode to a sleep mode; and
switching the second VA from the sleep mode to the listening mode, to listen to the second audio.

6. The method of claim 1, wherein the determining the ISM of the user comprises:
extracting at least one non-speech artifact from the first audio, the non-speech artifact comprising at least one of breathing sounds and non-lexical speaker noise; and
identifying at least one attribute that impacts the breathing pattern of the user based on the at least one non-speech artifact.

7. The method of claim 6, wherein the determining the ISM of the user comprises:
extracting at least one speech component from the first audio, the at least one speech component comprising at least one of phonemes and graphemes; and
determining an ISM value based on the at least one speech component, the at least one non-speech artifact, and the at least one attribute.

8. The method of claim 7, further comprising:
determining, based on the ISM value, a timestamp of the first audio, and a timestamp of the second audio, whether to regenerate at least one audio frame of at least one of the first audio and the second audio.

9. The method of claim 1, wherein the selecting the second VA from the plurality of VAs in the IoT environment to listen to the second audio comprises:
identifying the second VA in a direction of the movement of the user, based on detecting that the signal strength of the first audio from the first VA is dropping below a predefined signal threshold and the ISM value is greater than a predefined ISM coefficient threshold.

10. The method of claim 1, wherein the receiving the second audio from the second VA, comprises:
receiving the second audio from the second VA in an absence of the second VA detecting a hot word to initiate listening for the second audio.

11. The method of claim 1, wherein the selecting the second VA from the plurality of VAs in the IoT environment to listen to the second audio comprises:
identifying at least two VAs, from the plurality of VAs, in a direction of the movement of the user; and
selecting the second VA from the at least two VAs based on a speech frequency of the user and at least one device characteristic of the two or more VAs.

12. A system for receiving a voice command, the system comprising:
a memory storing at least one instruction; and
at least one processor configured to execute the at least one instruction to:
receive a first audio from a first virtual assistant (VA) from a plurality of virtual assistants (VAs) in an Internet of Things (IoT) environment, the first audio corresponding to a portion of an utterance of a user;
determine a breathing pattern of the user based on the first audio, and determining an intention to speak more (ISM) of the user based on the breathing pattern;
detect, based on the first audio, a movement of the user with respect to the plurality of VAs in the IoT environment;
select a second VA from the plurality of VAs in the IoT environment to listen to a second audio, based on at least one of the ISM of the user, a signal strength of the first audio, a voiceprint of the user, and the movement of the user;
receive the second audio from the second VA, the second audio corresponding to a continuation of the utterance; and
merge the first audio and the second audio to determine a voice command corresponding to the utterance, for execution within the IoT environment.

13. The system of claim 12, wherein the at least one processor is further configured to execute the at least one instruction to:
remove at least one duplicated portion of the utterance from the first audio received at the first VA and the second audio received at the second VA; and
regenerate at least one audio frame of at least one of the first audio and the second audio, based on determining that a signal strength for the at least one audio frame is less than a predefined threshold.

14. The system of claim 12, wherein the at least one processor is further configured to execute the at least one instruction to:
extract at least one non-speech artifact from the first audio, the non-speech artifact comprising at least one of breathing sounds and non-lexical speaker noise; and
identify at least one attribute that impacts the breathing pattern of the user based on the at least one non-speech artifact.

15. The system of claim 14, wherein the at least one processor is further configured to execute the at least one instruction to:
extract at least one speech component from the first audio, the at least one speech component comprising at least one of phonemes and graphemes; and
determine an ISM value based on the at least one speech component, the at least one non-speech artifact, and the at least one attribute.

16. The system of claim 12, wherein the at least one processor is further configured to execute the at least one instruction to:
identify the second VA in a direction of the movement of the user, based on detecting that the signal strength of the first audio from the first VA is dropping below a predefined signal threshold and the ISM value is greater than a predefined ISM coefficient threshold.

17. The system of claim 12, wherein the at least one processor is further configured to execute the at least one instruction to:
receive the second audio from the second VA in an absence of the second VA detecting a hot word to initiate listening for the second audio.

18. The system of claim 12, wherein the at least one processor is further configured to execute the at least one instruction to:
identify at least two VAs, from the plurality of VAs, in a direction of the movement of the user; and
select the second VA from the at least two VAs based on a speech frequency of the user, and at least one device characteristic of the at least two VAs.

19. The system of claim 12, wherein the at least one processor is further configured to execute the at least one instruction to:

detect the movement of the user with respect to the plurality of VAs in the IoT environment based on a pre-trained neural network configured to receive the first audio received at the first VA as an input, and output at least one of a walking angle, a walking distance, and a walking speed of the user with respect to the first VA.

20. A non-transitory computer readable medium for storing computer readable program code or instructions which are executable by a processor to perform a method of receiving a voice command, the method comprising:

receiving a first audio from a first virtual assistant (VA) from a plurality of virtual assistants (VAs) in an Internet of Things (IoT) environment, the first audio corresponding to a portion of an utterance of a user;

determining a breathing pattern of the user based on the first audio, and determining an intention to speak more (ISM) of the user based on the breathing pattern;

detecting, based on the first audio, a movement of the user with respect to the plurality of VAs in the IoT environment;

selecting a second VA from the plurality of VAs in the IoT environment to listen to a second audio, based on at least one of the ISM of the user, a signal strength of the first audio, a voiceprint of the user, and the movement of the user;

receiving the second audio from the second VA, the second audio corresponding to a continuation of the utterance; and merging the first audio and the second audio to determine a voice command corresponding to the utterance, for execution within the IoT environment.

\* \* \* \* \*